US012777477B2

(12) United States Patent
Liao et al.

(10) Patent No.: US 12,777,477 B2
(45) Date of Patent: Oct. 27, 2026

(54) RESOURCE CONFIGURATION METHOD AND COMMUNICATION APPARATUS

(71) Applicant: HUAWEI TECHNOLOGIES CO., LTD., Shenzhen (CN)

(72) Inventors: Shuri Liao, Shanghai (CN); Erkai Chen, Kista (SE); Youlong Cao, Shanghai (CN); Rui Xu, Shanghai (CN); Shengyue Dou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 364 days.

(21) Appl. No.: 18/430,819

(22) Filed: Feb. 2, 2024

(65) Prior Publication Data

US 2024/0188071 A1 Jun. 6, 2024

Related U.S. Application Data

(63) Continuation of application No. PCT/CN2022/093985, filed on May 19, 2022.

(30) Foreign Application Priority Data

Aug. 2, 2021 (CN) ........................ 202110883041.X

(51) Int. Cl.

| | |
|---|---|
| ***H04W 72/1268*** | (2023.01) |
| ***H04L 5/00*** | (2006.01) |
| ***H04W 72/0446*** | (2023.01) |
| ***H04W 72/115*** | (2023.01) |
| ***H04W 72/232*** | (2023.01) |

(Continued)

(52) U.S. Cl.
CPC ....... *H04W 72/1268* (2013.01); *H04L 5/0044* (2013.01); *H04W 72/0446* (2013.01); *H04W 72/115* (2023.01); *H04W 72/232* (2023.01); *H04W 72/12* (2013.01); *H04W 72/23* (2023.01)

(58) Field of Classification Search
CPC ......... H04W 72/1268; H04W 72/0446; H04W 72/115; H04W 72/232; H04W 72/12; H04W 72/23; H04L 5/0044
See application file for complete search history.

(56) References Cited

U.S. PATENT DOCUMENTS

| | | | | |
|---|---|---|---|---|
| 2022/0149997 A1* | 5/2022 | Wang | .................... | H04L 1/1822 |
| 2022/0232639 A1* | 7/2022 | Wang | .................... | H04L 5/0053 |
| 2023/0422235 A1* | 12/2023 | Singh | ...................... | H04L 1/189 |

FOREIGN PATENT DOCUMENTS

| | | |
|---|---|---|
| CN | 111432423 A | 7/2020 |
| WO | 2020204491 A1 | 10/2020 |

* cited by examiner

*Primary Examiner* — Michael A Keller
*Assistant Examiner* — Chhian (Amy) Ling
(74) *Attorney, Agent, or Firm* — Maier & Maier, PLLC

(57) ABSTRACT

A resource configuration method and a communication apparatus are provided, so that an SPS/CG period can better match an XR service that arrives periodically based on a frame rate, thereby effectively reducing a transmission delay of the XR service and improving system performance. The method includes the following steps: a network device sends first CG configuration information to a terminal. Correspondingly, the terminal receives the configuration information, and obtains first period duration M1 of a first CG period and a quantity X of CGs in the first CG period based on the information, where M1 is greater than zero, and X is an integer greater than zero.

18 Claims, 5 Drawing Sheets

(51) Int. Cl.

| | |
|---|---|
| *H04W 72/12* | (2023.01) |
| *H04W 72/23* | (2023.01) |

RESOURCE CONFIGURATION METHOD AND COMMUNICATION APPARATUS

CROSS-REFERENCE TO RELATED APPLICATIONS

This application is a continuation of International Application No. PCT/CN2022/093985, filed on May 19, 2022, which claims priority to Chinese Patent Application No. 202110883041.X, filed on Aug. 2, 2021. The disclosures of the aforementioned applications are hereby incorporated by reference in their entireties.

TECHNICAL FIELD

The embodiments relate to the field of communication technologies, a resource configuration method, and a communication apparatus.

BACKGROUND

In recent years, with continuous progress and improvement of extended reality (XR) technologies, related industries have developed vigorously. XR is a collective term of virtual reality (VR), augmented reality (AR), and mixed reality (MR) and is widely applied in many fields such as entertainment, games, medical care, advertising, industry, online education, and engineering. With continuous development and improvement of VR devices, content and platforms, and network systems, research on an effective transmission mode of an XR service and improvement of network capacity of the XR service can effectively promote development of end-to-end (E2E) industries. Therefore, the effective transmission mode of the XR service is of great practical value.

The XR service, as a video transmission service, arrives periodically based on a frame rate. For a periodic transmission service, semi-persistent scheduling (SPS) transmission may be provided for downlink transmission, and configured grant (CG) transmission may be provided for uplink transmission. However, an SPS/CG period cannot match an arrival moment of the XR service due to a non-integer arrival period of a video frame. Consequently, transmission of the video frame is delayed, and system performance is degraded.

SUMMARY

The embodiments provide a communication method and a communication apparatus, so that an SPS/CG period can better match an XR service that arrives periodically based on a frame rate, thereby effectively reducing a transmission delay of the XR service and improving system performance.

According to a first aspect, a communication method is provided. The method may be performed by a terminal or may be performed by a component (like a processor, a chip, or a chip system) of a terminal, or may be implemented by a logic module or software that can implement all or some terminal functions. The method includes: receiving CG configuration information from a network device; obtaining first period duration M1 of a first CG period based on the first CG configuration information, where M1 is greater than zero; obtaining a quantity X of CGs in the first CG period, where X is an integer greater than zero; and sending uplink data to the network device based on the first period duration M1 and the quantity X of the CGs.

In an embodiment, the network device sends the CG configuration information to the terminal, so that the terminal can obtain the first period duration of the CG period and the quantity of the CGs in the first CG period based on the configuration information, and send the uplink data to the network device based on the first period duration and the quantity of the CGs. In this case, each CG may appear at or after an arrival moment of a to-be-transmitted service. The method can better match a transmission service that arrives periodically based on a frame rate, thereby effectively reducing a transmission delay of this type of service and improving system performance.

In an embodiment, the uplink data is a to-be-transmitted service that arrives periodically based on a frame rate, for example, an XR video frame.

With reference to the first aspect, in some implementations of the first aspect, the sending uplink data to the network device based on the first period duration M1 and the quantity X of the CGs includes: determining a start location of at least one CG in the first CG period based on the first period duration M1 and the quantity X of the CGs; and sending the uplink data to the network device based on the start location of the at least one CG in the first CG period.

In an embodiment, determining the start location of the at least one CG can further ensure that a location of the uplink data sent by the terminal matches the start location of the CG, thereby effectively reducing a transmission delay of the uplink data.

With reference to the first aspect, in some implementations of the first aspect, a start location of an $i^{th}$ CG in the first CG period meets the following formula:

$$((\mathrm{SFN}_i \times a \times n)+(e_i \times n)+g_i)=((\mathrm{SFN} \times a \times n)+(e \times n)+y+\lceil (i-1) \times M1/X \rceil)\mathrm{mod}(1024 \times a \times n)$$

where $\mathrm{SFN}_1$ represents a start system frame number of the first CG period, a represents a quantity of slots included in a system frame, n represents a quantity of symbols included in a slot, e represents a start slot index of the first CG period in the system frame $\mathrm{SFN}_1$, y represents a start symbol index of the first CG period in the slot e, $\mathrm{SFN}_i$ a start system frame number of the $i^{th}$ CG in the first CG period, $e_i$ represents a start slot index of the $i^{th}$ CG in the first CG period in the system frame $\mathrm{SFN}_i$, $g_i$ represents a start symbol index of the $i^{th}$ CG in the first CG period in the slot $e_i$, i=1, 2, . . . , X, $\lceil\ \rceil$ represents rounding up to the nearest integer, mod represents a modulo operation, $\mathrm{SFN}_1$, e, y, $\mathrm{SFN}_i$, $e_i$, and $g_i$ are integers greater than or equal to zero, and a and n are integers greater than zero.

It should be understood that rounding up to the nearest integer may alternatively be rounding down to the nearest integer plus 1 or another calculation manner. This is not limited.

It should be further understood that if a to-be-rounded parameter is an integer, the parameter may still be the parameter itself after rounding.

With reference to the first aspect, in some implementations of the first aspect, the obtaining a quantity X of CGs in the first CG period includes: obtaining the quantity X of the CGs in the first CG period based on the first CG configuration information.

With reference to the first aspect, in some implementations of the first aspect, the obtaining a quantity X of CGs in the first CG period includes: obtaining the quantity X of the CGs in the first CG period based on DCI.

According to a second aspect, another communication method is provided. The method may be performed by a network device or may be performed by a component (like a processor, a chip, or a chip system) of a network device, or may be implemented by a logic module or software that can implement all or some network device functions. The method includes: sending information about first period duration M1 of a first CG period and information about a quantity X of CGs in the first CG period to a terminal, where M1 is greater than zero, and X is an integer greater than zero; and receiving uplink data from the terminal based on the first period duration M1 and the quantity X of the CGs in the first CG period.

With reference to the second aspect, in some implementations of the second aspect, first CG configuration information is sent to the terminal, where the first CG configuration information includes the information about the first period duration M1 of the first CG period and the information about the quantity X of the CGs in the first CG period.

With reference to the second aspect, in some implementations of the second aspect, first CG configuration information is sent to the terminal, where the first CG configuration information includes the information about the first period duration M1 of the first CG period; and DCI is sent to the terminal, where the DCI includes the information about the quantity X of the CGs in the first CG period.

With reference to the second aspect, in some implementations of the second aspect, the receiving uplink data from the terminal based on the first period duration M1 and the quantity X of the CGs in the first CG period includes: determining a start location of at least one CG in the first CG period based on the first period duration M1 and the quantity X of the CGs in the first CG period; and receiving the uplink data from the terminal based on the start location of the at least one CG in the first CG period.

With reference to the second aspect, in some implementations of the second aspect, a start location of an $i^{th}$ CG in the first CG period meets the following formula:

$$((SFN_i \times a \times n)+(e \times n)+g_i)=((SFN_1 \times a \times n)+(e \times n)+y+\lceil (i-1) \times M1/X \rceil) \bmod (1024 \times a \times n)$$

where $SFN_1$ represents a start system frame number of the first CG period, a represents a quantity of slots included in a system frame, n represents a quantity of symbols included in a slot, e represents a start slot index of the first CG period in the system frame $SFN_1$ y represents a start symbol index of the first CG period in the slot e, $SFN_i$ represents a start system frame number of the $i^{th}$ CG in the first CG period, $e_i$ represents a start slot index of the $i^{th}$ CG in the first CG period in the system frame $SFN_i$, $g_i$ represents a start symbol index of the $i^{th}$ CG in the first CG period in the slot $e_i$, i=1, 2, . . . , X, ⌈ ⌉ represents rounding up to the nearest integer, mod represents a modulo operation, $SFN_1$, e, y, $SFN_i$, $e_i$, and $g_i$ are integers greater than or equal to zero, and a and n are integers greater than zero.

According to a third aspect, another communication method is provided. The method may be performed by a terminal or may be performed by a component (like a processor, a chip, or a chip system) of a terminal, or may be implemented by a logic module or software that can implement all or some terminal functions. The method includes: receiving second CG configuration information from a network device; obtaining second period duration M2 of a second CG period based on the second CG configuration information, where M2 is greater than zero; obtaining a reference offset o of a start location of a CG in the second CG period; and sending uplink data to the network device based on the second period duration M2 and the reference offset o.

In an embodiment, the terminal obtains the second period duration of the second CG period and the reference offset o of the start location of the CG in the second CG period based on second CG configuration or the second CG configuration information and downlink control information that are sent by the network device, and sends the uplink data to the network device based on the second period duration and the reference offset o (in a unit of symbols) of the start location of the CG in the second CG period. According to the resource configuration method, the CG may appear at or after an arrival moment of a to-be-transmitted service (that is, the uplink data). The method can better match a transmission service that arrives periodically based on a frame rate, thereby effectively reducing a transmission delay of this type of service and improving system performance.

With reference to the third aspect, in some implementations of the third aspect, the sending uplink data to the network device based on the second period duration M2 and the reference offset o includes: determining the start location of the CG in the second CG period based on the second period duration M2 and the reference offset o; and sending the uplink data to the network device based on the start location of the CG.

In an embodiment, determining the start location of the CG in the second CG period can further ensure that a location of the uplink data sent by the terminal matches the start location of the CG, thereby effectively reducing a transmission delay of the uplink data.

With reference to the third aspect, in some implementations of the third aspect, the obtaining a reference offset o of a start location of a CG in the second CG period includes: obtaining the reference offset o of the start location of the CG in the second CG period based on the second CG configuration information, where the CG in the second CG period is identified by j, and j is an integer greater than or equal to zero; and the start location of the CG in the second CG period meets the following formula:

$$((SFN_2 \times a_2 \times n_2)+(e_2 \times n_2)+y_2)=(R \times a_2 \times n_2+D \times n_2+S+j \times M2+\lceil j \times o \rceil) \bmod (1024 \times a_2 \times n_2)$$

where $SFN_2$ represents a start system frame number of the CG in the second CG period, $a_2$ represents a quantity of slots included in a system frame, $n_2$ represents a quantity of symbols included in a slot, $e_2$ represents a start slot index of the CG in the second CG period in the system frame $SFN_2$, $y_2$ represents a start symbol index of the CG in the second CG period in the slot $e_2$, R represents a start system frame number of a physical uplink shared channel PUSCH configured based on the second CG configuration information, D represents a start slot index, in the system frame R, of the PUSCH configured based on the second CG configuration information, S represents a start symbol index, in the slot D, of the PUSCH configured based on the second CG configuration information, ⌈ ⌉ represents rounding up to the nearest integer, mod represents a modulo operation, $SFN_2$, $e_2$, and $y_2$ are integers greater than or equal to zero, and $a_2$ and $n_2$ are integers greater than zero.

With reference to the third aspect, in some implementations of the third aspect, the obtaining a reference offset o of a start location of a CG in the second CG period includes: obtaining the reference offset o of the start location of the CG in the second CG period based on DCI, where the CG in the second CG period is identified by j, and j is an integer greater than or equal to zero; and the start location of the CG in the second CG period meets the following formula:

$$((\mathrm{SFN}_2\times a_2\times n_2)+(e_2\times n_2)+y_2)=(a_2\times n_2\times c+d\times n_2+f+j\times M2+\lceil j\times o\rceil)\bmod(1024\times a_2\times n_2)$$

where $\mathrm{SFN}_2$ represents a start system frame number of the CG in the second CG period, $a_2$ represents a quantity of slots included in a system frame, $n_2$ represents a quantity of symbols included in a slot, $e_2$ represents a start slot index of the CG in the second CG period in the system frame $\mathrm{SFN}_2$, $y_2$ represents a start symbol index of the CG in the second CG period in the slot $e_2$, c represents a start system frame number of a PUSCH, d represents a start slot index of the PUSCH in the system frame c, f represents a start symbol index of the PUSCH in the slot d, represents rounding up to the nearest integer, mod represents a modulo operation, $\mathrm{SFN}_2$, $e_2$, $y_2$, c, d, and f are integers greater than or equal to zero, $a_2$ and $n_2$ are integers greater than zero.

In an embodiment, both M2 and the reference offset o are in a unit of symbols. It should be understood that when the unit of the reference offset o is milliseconds, o in the formulas in the manner 1 and the manner 2 may be replaced with "o/r", where r represents a time length (in a unit of ms) of one symbol.

According to a fourth aspect, another communication method is provided. The method may be performed by a network device or may be performed by a component (like a processor, a chip, or a chip system) of a network device, or may be implemented by a logic module or software that can implement all or some network device functions. The method includes: sending information about second period duration M2 of a second CG period and information about a reference offset o of a start location of a CG in the second CG period to a terminal, where M2 is greater than zero; and receiving uplink data from the terminal based on the second period duration M2 and the reference offset o of the start location of the CG in the second CG period.

With reference to the fourth aspect, in some implementations of the fourth aspect, the receiving uplink data from the terminal based on the second period duration M2 and the reference offset o of the start location of the CG in the second CG period includes: determining the start location of the CG in the second CG period based on the second period duration M2 and the reference offset o; and receiving the uplink data from the terminal based on the start location of the CG.

With reference to the fourth aspect, in some implementations of the fourth aspect, second CG configuration information is sent to the terminal, where the second CG configuration information includes the information about the second period duration M2 of the second CG period and the information about the reference offset o of the start location of the CG in the second CG period; the CG in the second CG period is identified by j, and j is an integer greater than or equal to zero; and the start location of the CG in the second CG period meets the following formula:

$$((\mathrm{SFN}_2\times a_2\times n_2)+(e_2\times n_2)+y_2)=(R\times a_2\times n_2+D\times n_2+S+j\times M2+\lceil j\times o\rceil)\bmod(1024\times a_2\times n_2)$$

where $\mathrm{SFN}_2$ represents a start system frame number of the CG in the second CG period, $a_2$ represents a quantity of slots included in a system frame, $n_2$ represents a quantity of symbols included in a slot, $e_2$ represents a start slot index of the CG in the second CG period in the system frame $\mathrm{SFN}_2$, $y_2$ represents a start symbol index of the CG in the second CG period in the slot $e_2$, R represents a start sent system frame number of a physical uplink shared channel PUSCH configured based on the second CG configuration information, D represents a start sent slot index, in the system frame R, of the PUSCH configured based on the second CG configuration information, S represents a start sent symbol index, in the slot D, of the PUSCH configured based on the second CG configuration information, ⌈ ⌉ represents rounding up to the nearest integer, mod represents a modulo operation, $\mathrm{SFN}_2$, $e_2$ and $y_2$ are integers greater than or equal to zero, $a_2$ and $n_2$ are integers greater than zero.

With reference to the fourth aspect, in some implementations of the fourth aspect, second CG configuration information is sent to the terminal, where the second CG configuration information includes the information about the second period duration M2 of the second CG period; DCI is sent to the terminal, where the DCI includes the information about the reference offset o of the start location of the CG in the second CG period; the CG in the second CG period is identified by j, and j is an integer greater than or equal to zero; and the start location of the CG in the second CG period meets the following formula:

$$((\mathrm{SFN}_2\times a_2\times n_2)+(e_2\times n_2)+y_2)=(a_2\times n_2\times c+d\times n_2+f+j\times M2+\lceil j\times o\rceil)\bmod(1024\times a_2\times n_2)$$

where $\mathrm{SFN}_2$ represents a start system frame number of the CG in the second CG period, $a_2$ represents a quantity of slots included in a system frame, $n_2$ represents a quantity of symbols included in a slot, $e_2$ represents a start slot index of the CG in the second CG period in the system frame $\mathrm{SFN}_2$, $y_2$ represents a start symbol index of the CG in the second CG period in the slot $e_2$, c represents a start sent system frame number of a physical uplink shared channel PUSCH, d represents a start sent slot index of the PUSCH in the system frame c, f represents a start sent symbol index of the PUSCH in the slot d, ⌈ ⌉ represents rounding up to the nearest integer, mod represents a modulo operation, $\mathrm{SFN}_2$, $e_2$, $y_2$, c, d, and f are integers greater than or equal to zero, $a_2$ and $n_2$ are integers greater than zero.

According to a fifth aspect, a communication apparatus is provided, and is configured to perform the method in any possible implementation of the first aspect or the third aspect. The apparatus includes modules configured to perform the method in any possible implementation of the first aspect or the third aspect.

The communication apparatus may include modules corresponding to performing the methods/operations/steps/actions described in the first aspect or the third aspect. The modules may be hardware circuits, or may be software, or may be implemented by hardware circuits in combination with software.

The communication apparatus may be a communication chip. The communication chip may include an input circuit or interface configured to send information or data, and an output circuit or interface configured to receive information or data.

The communication apparatus may be a communication device. The communication device may include a transmitting machine configured to send information or data, and a receiving machine configured to receive information or data.

The communication apparatus may be configured to perform the method in any possible implementation of the first aspect or the third aspect. The communication apparatus may be configured in a terminal, or the communication apparatus is the terminal.

According to a sixth aspect, another communication apparatus is provided, and is configured to perform the method in any possible implementation of the second aspect or the fourth aspect. The communication apparatus may include modules configured to perform the method in any possible implementation of the second aspect or the fourth aspect.

The communication apparatus may include modules corresponding to performing the methods/operations/steps/actions described in the second aspect or the fourth aspect. The modules may be hardware circuits, or may be software, or may be implemented by hardware circuits in combination with software.

The communication apparatus may be a communication chip. The communication chip may include an input circuit or interface configured to send information or data, and an output circuit or interface configured to receive information or data.

The communication apparatus may be a communication device. The communication device may include a transmitting machine configured to send information or data, and a receiving machine configured to receive information or data.

The communication apparatus may be configured to perform the method in any possible implementation of the second aspect or the fourth aspect. The communication apparatus may be configured in a network device, or the apparatus is the network device.

According to a seventh aspect, another communication apparatus is provided, and includes a processor and a memory. The memory is configured to store a computer program. The processor is configured to call the computer program from the memory and run the computer program, so that the apparatus performs the method in any possible implementation of the foregoing aspects.

Optionally, there are one or more processors, and there are one or more memories.

Optionally, the memory and the processor may be integrated together, or the memory and the processor are separately disposed.

Optionally, the communication device further includes a transmitting machine (transmitter) and a receiving machine (receiver). The transmitting machine and the receiving machine may be disposed separately or may be integrated together to be referred to as a transceiver machine (transceiver).

According to an eighth aspect, a communication system is provided, and includes: an apparatus configured to implement the method in the first aspect or any possible implementation of the first aspect, and an apparatus configured to implement the method in the second aspect or any possible implementation of the second aspect; or includes: an apparatus configured to implement the method in the third aspect or any possible implementation of the third aspect, and an apparatus configured to implement the method in the fourth aspect or any possible implementation of the fourth aspect.

The communication system may further include another device that interacts with the network device and/or the terminal in the solutions provided in the embodiments.

According to a ninth aspect, a computer program product is provided. The computer program product includes a computer program (which may also be referred to as code or instructions). When the computer program is run, a computer performs the method in any possible implementation of the foregoing aspects.

According to a tenth aspect, a non-transitory computer-readable storage medium is provided. The non-transitory computer-readable storage medium stores a computer program (which may also be referred to as code or instructions). When the computer program is run on a computer, the computer performs the method in any possible implementation of the foregoing aspects.

According to an eleventh aspect, a chip system is provided. The chip system includes a processor, configured to implement the method involved in the first aspect or any possible implementation of the first aspect, or configured to implement the method involved in any possible implementation of the foregoing aspects.

The chip system may further include a memory, and the memory is configured to store program instructions. The chip system may include a chip or may include a chip and another discrete component.

DETAILED DESCRIPTION OF EMBODIMENTS

The following describes the embodiments with reference to the accompanying drawings.

The embodiments may be applied to various communication systems, such as a long term evolution (LTE) system, an LTE frequency division duplex (FDD) system, an LTE time division duplex (TDD) system, a universal mobile telecommunications system (UMTS), a fifth generation (5G) mobile communication system, a new radio (NR) system or another evolved communication system, and a next-generation mobile communication system of a$_5$G communication system.

For ease of understanding of the embodiments, a communication system applicable to the embodiments is first described in detail with reference to FIG. 1.

Figure 1:
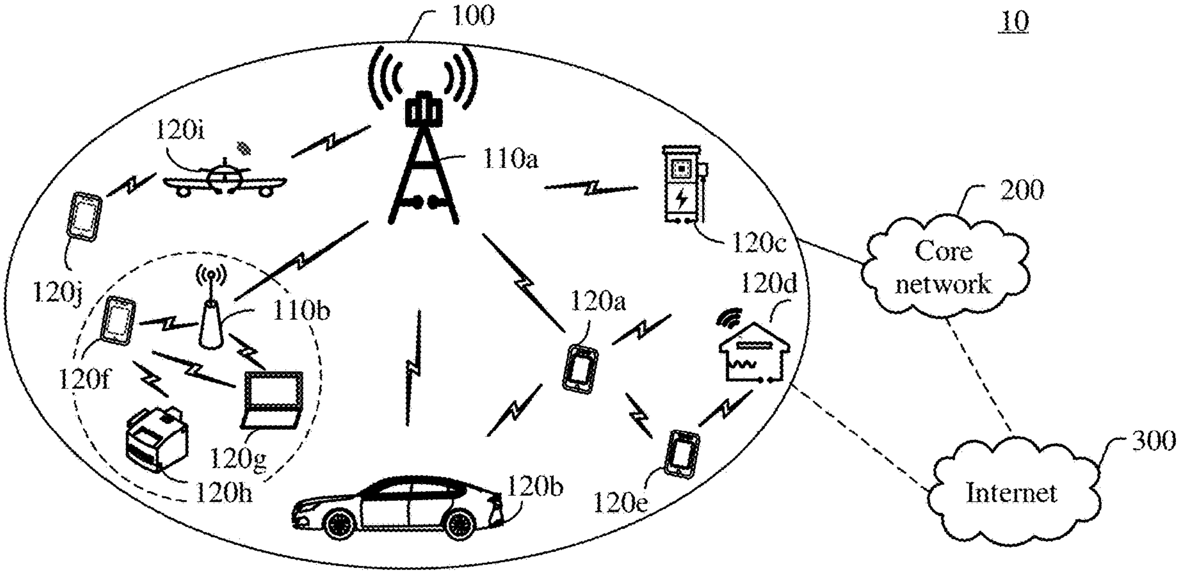
FIG. 1 is a schematic diagram of an architecture of a communication system according to an embodiment.

FIG. 1 is a schematic diagram of an architecture of a communication system 10 applied in an embodiment. As shown in FIG. 1, the communication system includes a radio access network 100 and a core network 200. Optionally, the communication system 10 may further include the Internet 300. The radio access network 100 may include at least one radio access network device (for example, 110*a* and 110*b* in FIG. 1), and may further include at least one terminal (for example, 120*a* to 120*j* in FIG. 1). The terminal is connected to the radio access network device in a wireless manner, and the radio access network device is connected to the core network in a wireless or wired manner. A core network device and the radio access network device may be independent and different physical devices, or functions of the core network device and logical functions of the radio access network device may be integrated into a same physical device, or some functions of the core network device and some functions of the radio access network device may be integrated into one physical device. A wired or wireless manner may be used for connection between terminals and between radio access network devices. FIG. 1 is only a schematic diagram. The communication system 10 may further include other network devices, for example, may further include a wireless relay device and a wireless backhaul device. This is not shown in FIG. 1.

The radio access network device may be a base station, an evolved base station (eNodeB), a transmission reception point (TRP), a next generation base station (gNB) in a fifth generation (5G) mobile communication system, a next generation base station in a sixth generation (6G) mobile communication system, a base station in a future mobile communication system, an access node in a Wi-Fi system, or the like; or may be a module or unit that completes some functions of a base station, for example, may be a central unit (CU) or may be a distributed unit (DU). The radio access network device may be a macro base station (for example, 110*a* in FIG. 1), or may be a micro base station or an indoor base station (for example, 110*b* in FIG. 1), or may be a relay node or a donor node. It may be understood that all or some functions of the radio access network device may also be implemented through a software function running on hardware or may be implemented through an instantiated virtualization function on a platform (for example, a cloud platform). A technique and a device form that are used by the radio access network device are not limited in the embodiments. For ease of description, the following provides descriptions by using an example in which the radio access network device is a base station.

The terminal may also be referred to as a terminal device, user equipment (UE), a mobile station, a mobile terminal, or the like. The terminal may be widely used in various scenarios, such as device-to-device (D2D), vehicle to everything (V2X) communication, machine-type communication (MTC), internet of things (IOT), virtual reality, augmented reality, industrial control, autonomous driving, remote medical, a smart grid, smart furniture, smart office, smart wearable, smart transportation, and a smart city. The terminal may be a mobile phone, a tablet computer, a computer with a wireless transceiver function, a wearable device, a vehicle, an uncrewed aerial vehicle, a helicopter, an airplane, a ship, a robot, a mechanical arm, a smart home device, or the like. A technique and a device that are used by the terminal are not limited in the embodiments.

The base station and the terminal may be fixed or movable. The base station and the terminal may be deployed on land, including an indoor or outdoor scenario, and a handheld or on-board scenario; or may be deployed on water; or may be deployed on an airplane, a balloon, or an artificial satellite in the air. Application scenarios of the base station and the terminal are not limited in the embodiments.

Roles of the base station and the terminal may be relative. For example, the helicopter or uncrewed aerial vehicle 120*i* in FIG. 1 may be configured as a mobile base station. For the terminal 120*j* that accesses the radio access network 100 through 120*i*, the terminal 120*i* is a base station; while for the base station 110*a*, 120*i* is a terminal. In other words, 110*a* and 120*i* communicate with each other based on a radio air interface protocol. 110*a* and 120*i* may alternatively communicate with each other based on an interface protocol between base stations. In this case, for 110*a*, 120*i* is also a base station. Therefore, both the base station and the terminal may be collectively referred to as a communication apparatus, 110*a* and 110*b* in FIG. 1 may be referred to as a communication apparatus having a base station function, and 120*a* to 120*j* in FIG. 1 may be referred to as a communication apparatus having a terminal function.

Communication between the base station and the terminal, between the base stations, and between the terminals may be performed based on a licensed spectrum, or may be performed based on an unlicensed spectrum, or may be performed based on both the licensed spectrum and the unlicensed spectrum. Communication may be performed based on a spectrum below 6 gigahertz (GHz), or may be performed based on a spectrum above 6 GHz or may be performed based on the spectrum below 6 GHz and the spectrum above 6 GHz simultaneously. A spectrum resource used for wireless communication is not limited in the embodiments.

In the embodiments, a function of the base station may be performed by a module (for example, a chip) in the base station, or may be performed by a control subsystem including a base station function. The control subsystem including the base station function may be a control center in an application scenario of the foregoing terminal, like a smart grid, industrial control, smart transportation, and a smart city. A function of the terminal may be performed by a module (for example, a chip or a modem) in the terminal, or may be performed by an apparatus including a terminal function.

The base station sends a downlink signal or downlink information to the terminal, where the downlink information is carried on a downlink channel; and the terminal sends an uplink signal or uplink information to the base station, where the uplink information is carried on an uplink channel.

In recent years, with continuous progress and improvement of extended reality technologies, related industries have developed vigorously. Nowadays, virtual reality technology has entered various fields closely related to production and life of people, such as education, entertainment, military affairs, medical care, environmental protection, transportation, and public health. Compared with conventional video services, virtual reality has at least the advantages of a plurality of views and strong interactivity, and provides a brand-new visual experience for users, which has great application value and commercial potential. XR is a collective term of VR, AR, and MR, and is widely applied in many fields such as entertainment, games, medical care, advertising, industry, online education, and engineering.

With continuous development and improvement of VR devices, content and platforms, and 5G or even next-generation 6G network systems, research on an effective transmission mode of an XR service and improvement of network capacity of the XR service can effectively promote development of end-to-end industries. Therefore, the effective transmission mode of the XR service is of great practical value.

Figure 2:
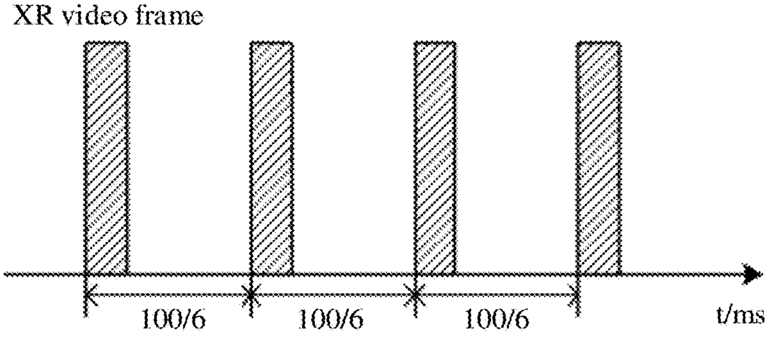
FIG. 2 is a schematic diagram of a transmission mode of an XR video frame.

As a video transmission service, a service model of the XR service may arrive periodically based on a frame rate. As shown in FIG. 2, horizontal coordinates represent time (t). For a video with a frame rate of 60 frames per second (FPS), in an ideal case, one XR video frame arrives every 100/6 milliseconds (ms).

Based on the characteristics of periodic arrival of data packets of the foregoing service, for the service, SPS transmission may be provided for downlink transmission, and CG transmission may be provided for uplink transmission.

The following describes the SPS and CG modes in detail.

1. SPS

SPS means that a downlink scheduling resource is allocated or specified once through a physical downlink control channel (PDCCH) during downlink transmission, and then a same time-frequency resource may be periodically reused for data transmission. This scheduling manner can effectively reduce PDCCH overheads.

An SPS period may be an integer multiple of a slot length supported by new radio (NR). For example, when subcarrier spacing is 30 kilohertz (kHz), and a slot length is 0.5 ms, an SPS period is (1-1280)×0.5 ms, that is, a minimum SPS period is 0.5 ms, and a maximum SPS period is 640 ms.

In an LTE system, there is one type of subcarrier spacing: 15 kHz. In an NR system, there are five types of optional subcarrier spacing, including 15 kHz, 30 kHz, 60 kHz, 120 kHz, and 240 kHz. Table 1 shows slot lengths and corresponding SPS periods of the five types of subcarrier spacing. As shown in Table 1:

TABLE 1

| Subcarrier spacing (kHz) | Slot length (ms) | SPS period (ms) |
|---|---|---|
| 15 | 1 | (1-640) × 1 |
| 30 | 0.5 | (1-1280) × 0.5 |
| 60 | 0.25 | (1-2560) × 0.25 |
| 120 | 0.125 | (1-5120) × 0.125 |
| 240 | 0.0625 | (1-10240) × 0.0625 |

In Table 1, the SPS periods include (1-640)×1 ms, (1-1280)×0.5 ms, (1-2560)×0.25 ms, (1-5120)×0.125 ms, and (1-10240)×0.0625 ms. Herein, each of (1-640), (1-1280), (1-2560) (1-5120), and (1-10240) represents any integer in a corresponding interval. For example, if an SPS period is (1-640)×1 ms, the SPS period may be denoted as K×1 ms, where K is an integer greater than or equal to 1 and less than or equal to 640.

A basic SPS process is as follows:

Step 1: A network device configures a related parameter of an SPS resource based on a radio resource control (RRC) message, including a configured scheduling-radio network temporary identifier (CS-RNTI), an SPS period, and the like. It should be understood that different SPS resource parameters may be configured based on a plurality of times of RRC messages, and different SPS resource parameters may correspond to parameters of SPS resources in different periods.

Step 2: When performing downlink data transmission, the network device indicates an activated SPS resource (indicating a period of the SPS resource) through a physical downlink control channel (PDCCH), based on downlink control information (DCI), and indicates, based on a resource allocation domain, a frequency domain resource allocated for SPS transmission.

Step 3: A location at which periodicity of the SPS resource takes effect meets the following formula:

$$(\text{numberOfSlotsPerFrame}\times\text{SFN}+\text{slot number in the frame})=[(\text{numberOfSlotsPerFrame}\times\text{SFNstart time}+\text{slotstart time})+N\times\text{periodicity}\times\text{numberOfSlotsPerFrame}/10]\text{modulo}(1024\times\text{numberOfSlotsPerFrame})$$

In this formula, SFN represents a system frame number, numberOfSlotsPerFrame represents a quantity of slots included in a system frame, slot number in the frame represents a number of a slot in the system frame, N represents an $N^{th}$ SPS period, periodicity represents an SPS period, SFNstart time represents a start system frame number of a physical downlink shared channel (PDSCH), and slotstart time represents a start slot index of the PDSCH in a start system frame SFNstart time.

Step 3 may be performed by a network device, or may be performed by a terminal device, or may be performed by both the network device and the terminal device. For example, the location at which the SPS periodicity takes effect may be calculated by a medium access control (MAC) entity in the network device or may be calculated by a MAC entity in the terminal device.

2. CG

CG means that an uplink scheduling resource is allocated or specified once through RRC or a PDCCH during uplink transmission, and then a same time-frequency resource may be periodically reused for uplink transmission.

A CG period may be a length of two symbols, a length of seven symbols, or an integer multiple of a length of 14 symbols that is supported by NR. For example, subcarrier spacing is 30 kHz, a slot length is 0.5 ms, and one slot includes 14 symbols. In this case, a CG period is two symbols, seven symbols, or n×14 symbols, where n=1-1280.

Table 2 shows CG periods respectively corresponding to five types of subcarrier spacing. As shown in Table 2:

TABLE 2

| Subcarrier spacing (kHz) | CG period (Symbol) |
|---|---|
| 15 | 2, 7, or (1-640) × 14 |
| 30 | 2, 7, or (1-1280) × 14 |
| 60 (normal CP length) | 2, 7, or (1-2560) × 14 |
| 60 (extended CP length) | 2, 6, or (1-2560) × 12 |
| 120 | 2, 7, or (1-5120) × 14 |

There are two types of CG transmission. In type 1, a related parameter for CG transmission is configured based on an RRC message, and a corresponding CG resource (indicating a period of the CG resource) is activated based on the RRC message. Type 2 is similar to the SPS resource configuration manner. A related parameter for CG transmission may be configured based on an RRC message, a corresponding CG resource is activated through a PDCCH, and an allocated frequency domain resource is indicated.

The following describes processes of the two types of CG transmission in detail.

A basic process of type 1 is as follows:

Step 1: A network device configures a related parameter of a CG resource based on an RRC message, including a CS-RNTI, a period, CG time-domain and frequency-domain resources, and the like. It should be understood that CG resources configured based on a plurality of times of RRC messages may correspond to parameters of a plurality of CG resources in different periods, and the network device activates the corresponding CG resource based on the RRC message.

Step 2: A location at which periodicity of the CG resource takes effect meets the following formula:

$$[(\text{SFN}\times\text{numberOfSlotsPerFrame}\times\text{numberOfSymbolsPerSlot})+(\text{slot number in the frame}\times\text{numberOfSymbolsPerSlot})+\text{symbol number in the slot}]=(\text{timeReferenceSFN}\times\text{numberOfSlotsPerFrame}\times\text{numberOfSymbolsPerSlot}+\text{timeDomainOffset numberOfSymbolsPerSlot}+S+N\times\text{periodicity})\text{modulo}(1024\times\text{numberOfSlotsPerFrame numberOfSymbolsPerSlot})$$

In this formula, numberOfSymbolsPerSlot represents a quantity of symbols included in a slot, symbol number in the slot represents a number of a symbol in the slot, timeReferenceSFN represents a start system frame number of a physical uplink shared channel PUSCH configured based on an RRC message, timeDomainOffset represents a start slot index that is of the PUSCH configured based on the RRC message and that is in the system frame timeReferenceSFN, S represents a start symbol index that is of the PUSCH configured based on the RRC message and that is in the slot D, and representation of the other parameters is the same as that of the SPS. Details are not described herein again.

A basic process of type 2 is as follows:

Step 1: A network device configures a related parameter of a CG resource based on an RRC message, including a CS-RNTI, a CG period, and the like. Parameters of different CG resources (for example, corresponding to different periods) may be configured based on the RRC message.

Step 2: For uplink data transmission, the network device indicates an activated CG resource (indicating a period of the CG resource) through a PDCCH, based on DCI, and indicates, based on a resource allocation domain, time-domain and frequency-domain resources allocated for CG transmission.

Step 3: A location at which periodicity of the CG resource takes effect meets the following formula:

[(SFN×numberOfSlotsPerFrame×numberOfSymbolsPerSlot)+(slot number in the frame×numberOfSymbolsPerSlot)+symbol number in the slot]=[(SFNstart time×numberOfSlotsPerFrame×numberOfSymbolsPerSlot slotstart time numberOfSymbolsPerSlot+symbolstart time)+$N$×periodicity]modulo(1024×numberOfSlotsPerFrame×numberOfSymbolsPerSlot)

In this formula, SFNstart time represents a start sent system frame number of a physical uplink shared channel (PUSCH), slotstart time represents a start sent slot index of the PUSCH in the start sent system frame number SFNstart time, symbolstart time represents a start sent symbol index of the PUSCH in the start sent slot index, and representation of the other parameters is the same as that of the SPS. Details are not described herein again.

Step 2 in type 1 and step 3 in type 2 may be performed by a network device, or may be performed by a terminal device, or may be performed by both the network device and the terminal device. For example, the location at which the periodicity of the CG resource takes effect may be calculated by a MAC entity in the network device or may be calculated by a MAC entity in the terminal device.

Figure 3:
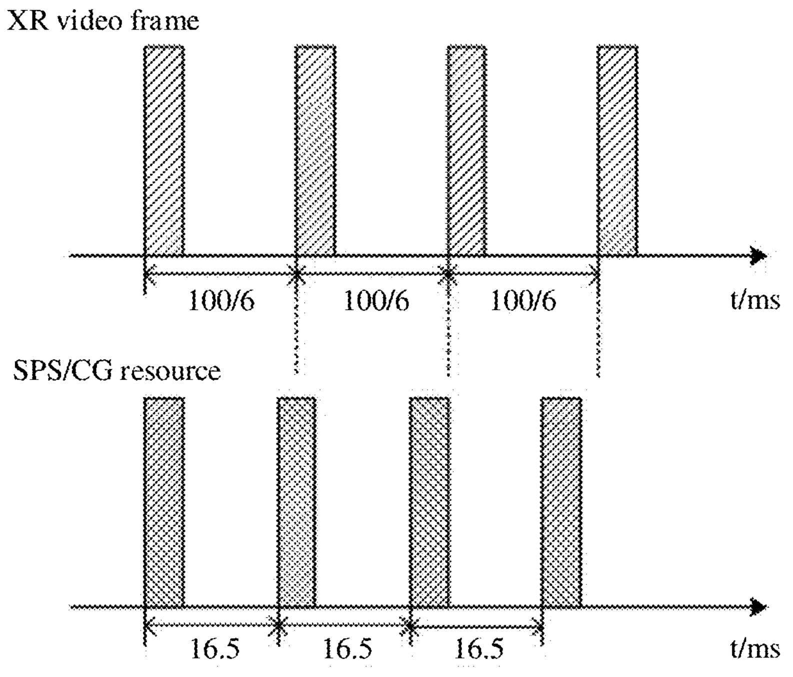
FIG. 3 is a schematic diagram of data transmission of an XR service in an SPS/CG mode.

FIG. 3 is a schematic diagram of data transmission of an XR service in an SPS/CG mode. As shown in FIG. 3, horizontal axes represent time (t), an inter-frame space of XR video frames is 100/6 ms (that is, a frame rate of the XR service is 60 Hz), an SPS/CG period (the period with subcarrier spacing of 30 kHz) is 16.5 ms, and each period includes one SPS/CG resource. It should be understood that the SPS/CG period determined by a network device may be a period closest to the inter-frame space of the XR video frames. However, the SPS/CG resource cannot match an arrival moment of the XR service because an arrival period of the XR video frame is not an integer multiple of a slot length. As shown in FIG. 3, the first XR video frame may be transmitted on the first SPS/CG resource at the earliest, the second XR video frame may be transmitted on the third SPS/CG resource at the earliest, and the third XR video frame may be transmitted on the fourth SPS/CG resource at the earliest. The SPS/CG resource cannot match the arrival moment of the XR service. Consequently, transmission of the XR video frame is delayed, and system performance is degraded.

Based on the above, if a to-be-transmitted service is a service that arrives periodically based on a frame rate, and a transmission period (that is, the inter-frame space) is not an integer multiple of a slot length, an SPS/CG resource cannot match an arrival moment of the to-be-transmitted service. Consequently, a transmission delay is generated in the to-be-transmitted service, and system performance is degraded.

Before the resource configuration method is described, the following several points are first described.

First, in the embodiments, terms and abbreviations, for example, frame rate or inter-frame space, are examples provided for ease of description, and should not be construed as any limitation. The embodiments may not exclude a possibility of defining another term that can implement a same or similar function in an existing or future protocol.

Second, the terms "first", "second", and various numbers in the following embodiments are merely used for differentiation for ease of description but are not intended to limit the scope of the embodiments. For example, different CG periods are distinguished. It needs to be noted that ordinal numbers such as "first" and "second" used in the embodiments are used to distinguish between a plurality of objects, but are not intended to limit a sequence, a time sequence, priorities, or importance of the plurality of objects. For example, first CG period duration and second CG period duration are merely used to distinguish between different CG periods, but do not indicate that the two CG periods are different in importance or the like.

Third, "protocol" involved in the embodiments may be a standard protocol in a communication field, for example, may include an LTE protocol, an NR protocol, and a related protocol applied to a future communication system. This is not limited.

Fourth, "a plurality of" means two or more than two. "And/or" describes an association relationship between associated objects and indicates that three relationships may exist. For example, A and/or B may indicate the following three cases: only A exists, both A and B exist, and only B exists, where A and B may be singular or plural. The character "/" may indicate an "or" relationship between associated objects. "At least one of the following items (pieces)" or a similar expression thereof refers to any combination of these items, including any combination of singular items (pieces) or plural items (pieces). For example, at least one of a, b, and c may indicate a, or b, or c, or a and b, or a and c, or b and c, or a, b, and c, where a, b, and c may be singular or plural.

The embodiments provide a resource configuration method. A terminal obtains first period duration of a first CG period and a quantity of CGs in the first CG period based on first CG configuration or first CG configuration information and downlink control information that are sent by a network device and sends uplink data to the network device based on the first period duration and the quantity of the CGs in the first period duration. According to the resource configuration method, the CG may appear at or after an arrival moment of a to-be-transmitted service (that is, the uplink data). The method can better match a transmission service that arrives periodically based on a frame rate, thereby effectively reducing a transmission delay of this type of service and improving system performance.

Figure 4:
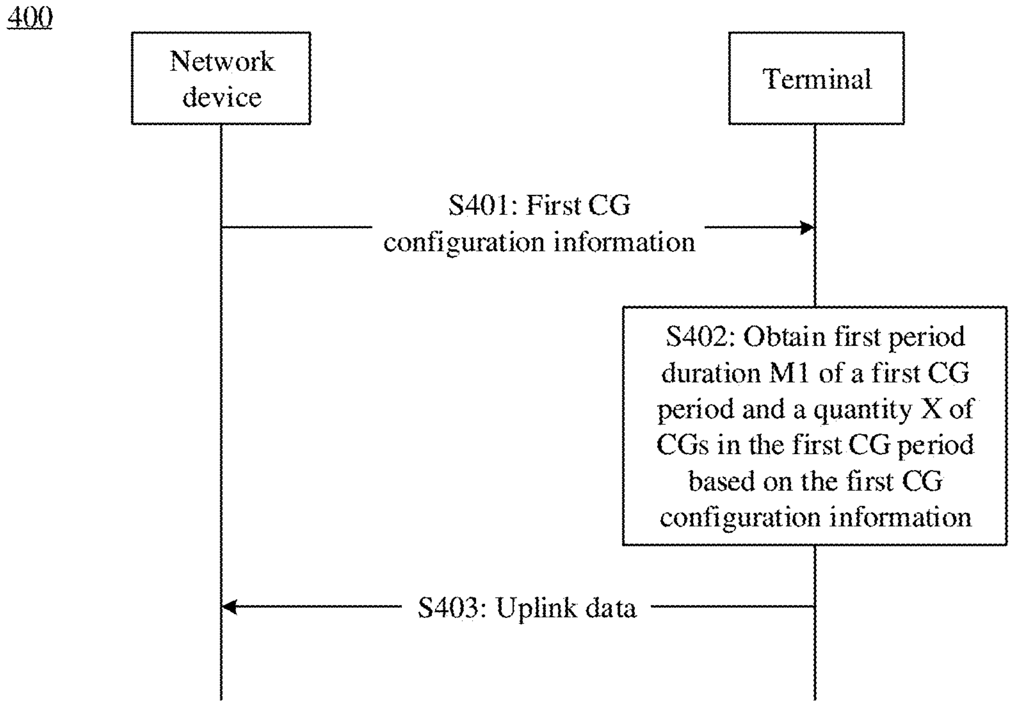
FIG. 4 is a schematic flowchart of a resource configuration method according to an embodiment.

The following describes in detail a resource configuration method 400 provided in an embodiment with reference to FIG. 4. The method 400 may be applied to the communication system 100 shown in FIG. 1, but this embodiment is not limited thereto. In FIG. 4, the method is illustrated by using an example in which a network device and a terminal serve as execution bodies of the interaction illustration, but the embodiment may not limit the execution bodies of the interaction illustration. For example, the network device in FIG. 4 may alternatively be a chip, a chip system, or a processor that supports the network device in implementing the method or may be a logic module or software that can implement all or some functions of the network device. The terminal in FIG. 4 may alternatively be a chip, a chip system, or a processor that supports the terminal in implementing the method or may be a logic module or software that can implement all or some functions of the terminal.

FIG. 4 shows a resource configuration method 400 according to an embodiment. As shown in FIG. 4, the method 400 may include the following steps:

S401: A network device sends first CG configuration information to a terminal. Correspondingly, the terminal receives the first CG configuration information. Alternatively, a network device sends first CG configuration information and DCI to a terminal. Correspondingly, the terminal receives the first CG configuration information and the DCI.

It should be understood that when the network device sends the first CG configuration information to the terminal, the first CG configuration information may include information about first period duration M1 of a first CG period and information about a quantity X of CGs in the first CG period. When the network device sends the first CG configuration information and the DCI to the terminal, the first CG configuration information includes information about first period duration M1 of a first CG period, and the DCI includes information about a quantity X of CGs in the first CG period.

S402: The terminal obtains first period duration M1 of a first CG period and a quantity X of CGs in the first CG period based on the first CG configuration information, where M1 is greater than zero, and X is an integer greater than zero. Alternatively, the terminal obtains first period duration M1 of a first CG period based on the first CG configuration information and obtains a quantity X of CGs in the first CG period based on the DCI.

S403: The terminal sends uplink data to the network device based on the first period duration M1 and the quantity X of the CGs in the first CG period. Correspondingly, the network device receives the uplink data based on the first period duration M1 and the quantity X of the CGs in the first CG period.

In this embodiment, the uplink data is a to-be-transmitted service that arrives periodically based on a frame rate, for example, an XR video frame.

In this embodiment, the network device sends the CG configuration information to the terminal, so that the terminal can obtain the first period duration of the CG period and the quantity of the CGs in the first CG period based on the configuration information, and send the uplink data to the network device based on the first period duration and the quantity of the CGs. In this case, each CG may appear at or after an arrival moment of a to-be-transmitted service. The method can better match a transmission service that arrives periodically based on a frame rate, thereby effectively reducing a transmission delay of this type of service and improving system performance.

For example, the network device may determine the first period duration M1 of the first CG period and the quantity X of the CGs in the first CG period in the following manner.

Step 1: The network device obtains a frame rate or an inter-frame space of a to-be-transmitted service.

It should be understood that the frame rate and the inter-frame space are reciprocal of each other, that is, frame rate=1/inter-frame space. The frame rate of the to-be-transmitted service may also be referred to as a transmission frequency of the to-be-transmitted service, and the inter-frame space may also be referred to as a frame period.

The frame rate or the inter-frame space of the to-be-transmitted service may be obtained in the following manners:

1. The network device obtains the frame rate or the inter-frame space based on configuration information of a quality of service (QoS) flow. For example, a QoS template notifies the network device of an arrival period of a service corresponding to the QoS.
2. The network device estimates an arrival period (inter-frame space) or a frame rate of a data packet by detecting an arrival time interval of the data packet in a data flow.
3. During uplink transmission, the terminal may report the frame rate or the inter-frame space to the network device in a form of auxiliary information or the like.

Step 2: The network device determines, based on the frame rate or the inter-frame space, that a sum of x inter-frame spaces is m, where x is an integer greater than 0 and m is an integer greater than 0, and determines the first period duration M1=m×j of the first CG period and the quantity X=x×j of the CGs in the first CG period, where j is an integer greater than 0.

Using an XR service with system subcarrier spacing of 30 kHz and a frame rate of 60 FPS as an example, the following describes in detail a process of determining the first period duration M1 of the first CG period and the quantity X of the CGs in the first CG period.

The system subcarrier spacing is 30 kHz, a slot length is 0.5 ms, that is, a length of 14 symbols is 0.5 ms, an inter-frame space of the XR service with the frame rate of 60 FPS is 100/6 ms, and 100/6 is not an integer and is not an integer multiple of a length of 2, 4, or 14 symbols. Assuming that a sum of x inter-frame spaces is an integer, that is, 100/6×x (ms)=50/3×x (ms) is an integer, x may be an integer multiple of 3. In this embodiment, let x=3, that is, a sum of lengths of three consecutive frames is 50 ms, which is an integer and is an integer multiple of the length of 14 symbols. Therefore, the first period duration M1 of the CG period may be configured to be 14×2×50=1400 symbols (the length of 14 symbols is one slot 0.5 ms, and the quantity of symbols in 50 ms is 14×2×50), and the quantity X of the CGs in the CG period may be configured to be 3.

Table 3 shows the first period duration M1 of the first CG period and the quantity X of the CGs in the first period duration that are configured by using the resource configuration method in this embodiment for XR services with different frame rates. As shown in Table 3:

TABLE 3

| Frame rate/Frame period | First period duration of CG period | Quantity of CGs in first period duration |
|---|---|---|
| 30 FPS/(100/3) ms | 2800 symbols (100 ms) | 3 |
| 60 FPS/(100/6) ms | 1400 symbols (50 ms) | 3 |
| 90 FPS/(100/9) ms | 2800 symbols (100 ms) | 9 |
| 120 FPS/(100/12) ms | 700 symbols (25 ms) | 3 |

Table 3 shows first period duration of a CG period corresponding to each frame rate, and the first period duration of the CG period shown in Table 3 is a minimum period that can be configured for the CG. It should be understood that the first period duration of the CG period corresponding to each frame rate may alternatively be an integer multiple of the first period duration of the CG period shown in Table 3. Correspondingly, the quantity of the CGs in the first period duration may alternatively be an integer multiple of the quantity of the CGs in the first period duration shown in Table 3. For example, for an XR service with a frame rate of 30 FPS, the first period duration M1 of the CG period may be configured to be 2×2800 symbols, and correspondingly the quantity X of the CGs in the first period duration is 2×3.

In an optional implementation, that the terminal sends the uplink data to the network device based on the first period duration M1 and the quantity X of the CGs includes the following steps: the terminal determines a start location of at least one CG in the first CG period based on the first period duration M1 and the quantity X of the CGs; and the terminal sends the uplink data to the network device based on the start location of the at least one CG in the first CG period. Correspondingly, that the network device receives the uplink data based on the first period duration M1 and the quantity X of the CGs includes the following steps: the network device determines a start location of at least one CG in the first CG period based on the first period duration M1 and the quantity X of the CGs; and the network device receives the uplink data based on the start location of the at least one CG in the first CG period.

For example, to ensure that the CG can better match the arrival of the XR service, a start moment of the first CG in the first period duration of the first CG period may be aligned with an arrival moment of the first frame. In addition, it is ensured that other CGs in the long CG period may appear at or after the arrival moment of the XR video frame. Therefore, in first period duration, a start symbol offset of an $i^{th}$ CG may be defined as ⌈(i−1)*periodicityExt-r16/X⌉, where ⌈ ⌉ represents an operation of rounding up to the nearest integer, and i=1, 2, . . . , X. Rounding up to the nearest integer can ensure that the CG resource is at or after the arrival moment of the XR video frame.

It should be understood that rounding up to the nearest integer may alternatively be rounding down to the nearest integer plus 1 or another calculation manner. This is not limited.

It should be further understood that if a to-be-rounded parameter is an integer, the parameter may still be the parameter itself after rounding.

With reference to the foregoing example, when the first period duration M1 is 1400 symbols, and the quantity X of the CGs in the first period duration is 3, it can be obtained according to the foregoing offset formula that a start symbol offset of the first CG is the zeroth symbol in the first period duration M1, a start slot offset of the second CG is the 466th symbol in the first period duration M1, and a start slot offset of the third CG is the 933rd symbol in the first period duration M1.

Figure 5:
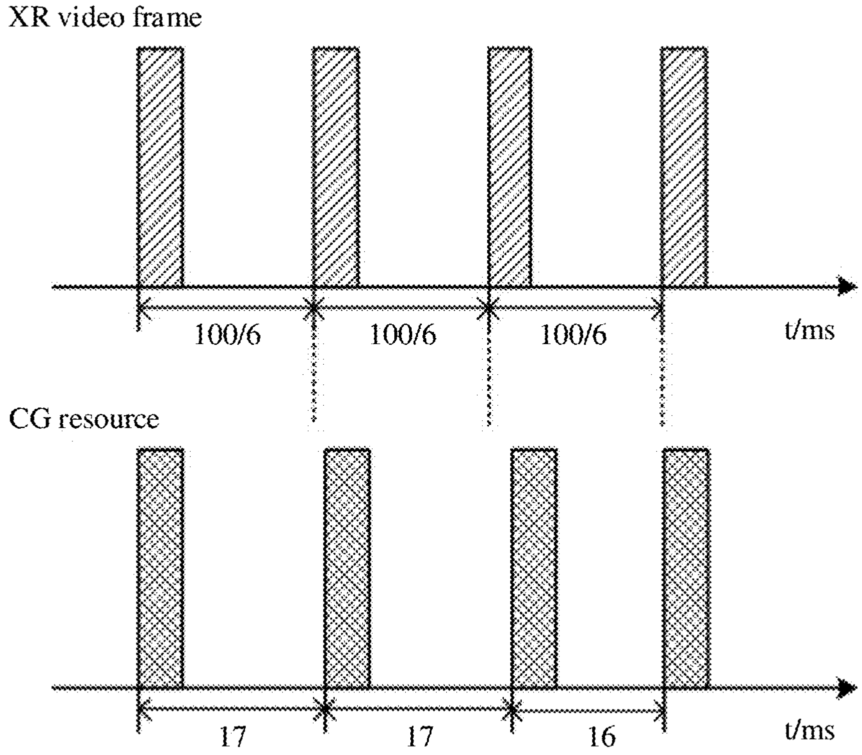
FIG. 5 is a schematic diagram of CG resource distribution for matching an XR service according to an embodiment.

FIG. 5 is a schematic diagram of CG resource distribution for matching an XR service according to an embodiment. As shown in FIG. 5, an inter-frame space of XR video frames at arrival moments is 100/6 ms, one CG period is 1400 symbols (that is, 50 ms), and a location at which a CG appears in each period can be kept at or after an arrival moment of an XR video frame, that is, the first XR video frame may be transmitted on the first CG, the second XR video frame may be transmitted on the second CG, and the third XR video frame may be transmitted on the third CG. The method for configuring CG parameters can greatly reduce a transmission delay of the XR service.

In an optional implementation, a start location of an $i^{th}$ CG in the first CG period meets the following formula:

$$((SFN_i \times a \times n)+(e \times n)+g_i)=((SFN \times a \times n)+(e \times n)+\lceil (i-1)\times M1/X\rceil)\bmod(1024\times a\times n) \quad (1)$$

In this formula, $SFN_1$ represents a start system frame number of the first CG period, a represents a quantity of slots included in a system frame, n represents a quantity of symbols included in a slot, e represents a start slot index of the first CG period in the system frame $SFN_1$, y represents a start symbol index of the first CG period in the slot e, $SFN_i$ represents a start system frame number of the $i^{th}$ CG in the first CG period, $e_i$ represents a start slot index of the $i^{th}$ CG in the first CG period in the system frame $SFN_i$, $g_i$ represents a start symbol index of the $i^{th}$ CG in the first CG period in the slot $e_i$, i=1, 2, . . . , X, ⌈ ⌉ represents rounding up to the nearest integer, mod represents a modulo operation, $SFN_1$, e, y, $SFN_i$, $e_i$, and $g_i$ are integers greater than or equal to zero, and a and n are integers greater than zero.

For the start location of the first CG period, $SFN_i$, e, and y may be obtained in the following two manners:

Manner 1: When a quantity X of CGs in the first CG period is carried in first CG configuration information and sent by the network device to the terminal, $SFN_i$, e, and y for the start location of the first CG period meet the following formula:

$$((SFN \times a \times n)+(e \times n)+y)=(R+a\times n+D\times n+S+i\times M1)\bmod(1024\times a\times n) \quad (2)$$

Manner 2: When a quantity X of CGs in the first CG period is carried in DCI and sent by the network device to the terminal, $SFN_i$, e, and y for the start location of the first CG period meet the following formula:

$$((SFN_i \times a \times n)+(e \times n)+y)=(a\times n\times c+d\times n+f+i\times M1)\bmod(1024\times a\times n) \quad (3)$$

For meanings of parameters in the foregoing formula (2) and formula (3), refer to meanings of parameters in the foregoing formula (1). Details are not described herein again.

In the foregoing formula (1) to formula (3), the first period duration M1 of the first CG period is in a unit of symbols. It should be understood that the foregoing formulas may be correspondingly transformed based on different units of M1.

The method 400 is described by using the CG configuration as an example. It should be understood that, for a configuration manner of SPS, refer to the configuration manner of the CG in the method 400. Details are not described herein again. However, a start location of $i^{th}$ SPS in a first SPS period meets the following formula:

$$[SFN_i \times a_4+f_i]=(SFN_4\times a_4+b_4+\lceil (i-1)\times P1\times a_4/(X1\times 10\rceil)\bmod(1024\times a_4) \quad (4)$$

For the start location of the first SPS period, $SFN_4$ and k meet the following formula:

$$(SFN_4\times a_4+b_4)=[(a_4\times c_3+d_3)+j_1\times P1\times a_4/10]\bmod(1024\times a_4) \quad (5)$$

In the foregoing formula (4) and formula (5), $SFN_4$ represents a start system frame number of the first SPS period, $a_4$ represents a quantity of slots included in a system frame, $b_4$ represents a start slot index of the first SPS period in the system frame $SFN_4$, $c_3$ represents a start system frame number of a PDSCH, $d_3$ represents a start slot index of the PDSCH, P1 represents first period duration (ms) of the first SPS period, $SFN_i$ represents a start system frame number of the $i^{th}$ SPS in the first SPS period, $f_i$ represents a start slot index of the $i^{th}$ SPS in the first SPS period in the system frame $SFN_i$, i=1, 2, . . . , X1, ⌈ ⌉ represents rounding up to the nearest integer, mod represents a modulo operation, $SFN_4$, $b_4$, $c_3$, $d_3$, $SFN_i$, and $f_i$ are integers greater than or equal to zero, and $a_4$, P1, and X1 are integers greater than zero.

In the LTE and NR standards, duration of a system frame is fixed to 10 ms, a system allocates a system frame number (SFN) to each system frame, and a value range of the SFN is 0 to 1023. Each frame includes 10 subframes, duration of each subframe is fixed to 1 ms, and a value range is 0 to 9. A quantity of slots included in each subframe is related to subcarrier spacing of the system, that is, the quantity of the slots included in each subframe (N slot)=1/(15 kHz/subcarrier spacing). For example, when the subcarrier spacing is 30 kHz, one subframe includes two slots.

The embodiments provide a resource configuration method. The terminal obtains the second period duration of the second CG period and the reference offset o of the start location of the CG in the second CG period based on second CG configuration or the second CG configuration information and downlink control information that are sent by the network device, and sends the uplink data to the network device based on the second period duration and the reference offset o (in a unit of symbols) of the start location of the CG in the second CG period. According to the resource configuration method, the CG may appear at or after an arrival moment of a to-be-transmitted service (that is, the uplink data). The method can better match a transmission service that arrives periodically based on a frame rate, thereby effectively reducing a transmission delay of this type of service and improving system performance.

Figure 6:
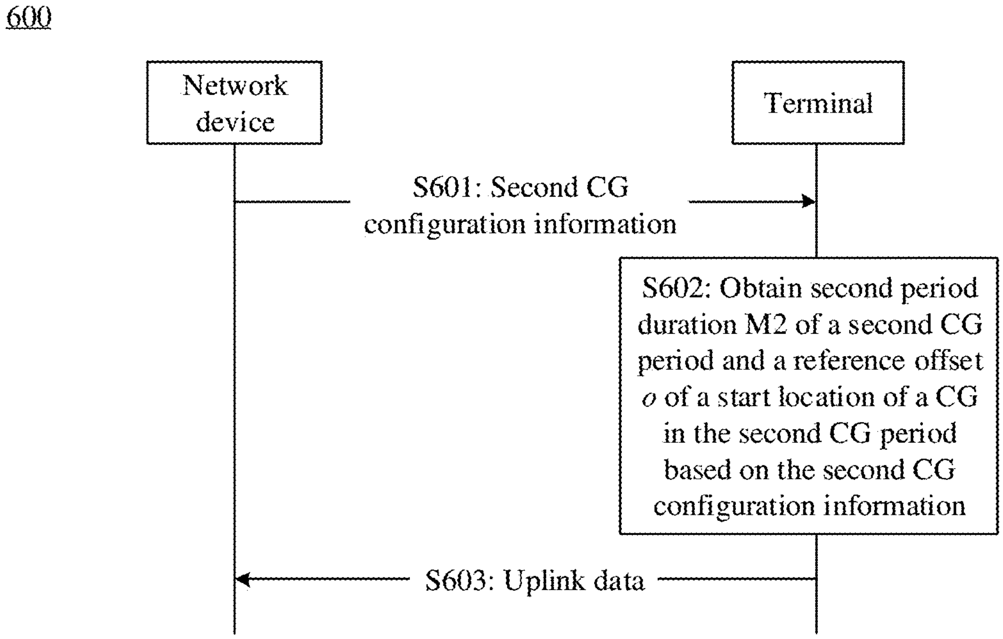
FIG. 6 is a schematic flowchart of another resource configuration method according to an embodiment.

The following describes in detail another resource configuration method 600 provided in an embodiment with reference to FIG. 6. The method 600 may be applied to the communication system 100 shown in FIG. 1, but this embodiment is not limited thereto. In FIG. 6, the method is illustrated by using an example in which a network device and a terminal serve as execution bodies of the interaction illustration, but the embodiment may not limit the execution bodies of the interaction illustration. For example, the network device in FIG. 6 may alternatively be a chip, a chip system, or a processor that supports the network device in implementing the method or may be a logic module or software that can implement all or some functions of the network device. The terminal in FIG. 6 may alternatively be a chip, a chip system, or a processor that supports the terminal in implementing the method or may be a logic module or software that can implement all or some functions of the terminal.

FIG. 6 shows another resource configuration method 600 according to an embodiment. As shown in FIG. 6, the method 600 may include the following steps:

S601: A network device sends second CG configuration information to a terminal. Correspondingly, the terminal receives the second CG configuration information. Alternatively, a network device sends second CG configuration information and DCI to a terminal. Correspondingly, the terminal receives the second CG configuration information and the DCI.

It should be understood that when the network device sends the second CG configuration information to the terminal, the second CG configuration information may include information about second period duration M2 of a second CG period and information about a reference offset o of a start location of a CG in the second CG period. When the network device sends the second CG configuration information and the DCI to the terminal, the second CG configuration information includes information about second period duration M2 of a second CG period, and the DCI includes information about a reference offset o of a start location of a CG in the second CG period.

S602: The terminal obtains second period duration M2 of a second CG period and a reference offset o of a start location of a CG in the second CG period based on the second CG configuration information, where M2 is greater than zero. Alternatively, the terminal obtains second period duration M2 of a second CG period based on the second CG configuration information, and obtains a reference offset o of a start location of a CG in the second CG period based on the DCI.

S603: The terminal sends uplink data to the network device based on the second period duration M2 and the reference offset o. Correspondingly, the network device receives the uplink data based on the second period duration M2 and the reference offset o.

In this embodiment, the network device sends the CG configuration information to the terminal, so that the terminal can obtain the second period duration of the CG period and the reference offset of the start location of the CG in the second CG period based on the configuration information, and send the uplink data to the network device based on the second period duration and the reference offset of the start location of the CG. In this case, each CG may appear at or after an arrival moment of a to-be-transmitted service. The method can better match a transmission service that arrives periodically based on a frame rate, thereby effectively reducing a transmission delay of the XR service and improving system performance.

For example, the network device may determine the second period duration M2 of the second CG period and the reference offset o of the start location of the CG in the second CG period in the following manner.

Step 1: The network device obtains a frame rate or an inter-frame space of to-be-transmitted data.

Refer to the manner of obtaining the frame rate or the inter-frame space in the method 400. Details are not described herein again.

Step 2: The network device obtains, from a plurality of CG periods specified in a protocol, a CG period that is close to the inter-frame space of the to-be-transmitted service and determines a difference between the inter-frame space of the to-be-transmitted service and the close CG period as the reference offset o of the CG period. When a value of o is greater than 0, the start location of the CG period in terms of time is backward offset compared with a start location of the close CG period. When a value of o is less than 0, the start location of the CG period in terms of time is forward offset compared with the start location of the close CG period. When a value of o is 0, the start location of the CG period in terms of time is equal to the start location of the close CG period.

The following describes in detail a process of determining a CG period and an offset of the CG period with reference to Table 4 using an example in which a CG period with subcarrier spacing of 30 kHz is two symbols, seven symbols, or (1-1280)×14 symbols. It should be understood that a slot length of each slot at 30 kHz is 0.5 ms, each slot includes 14 symbols, and a symbol length of each symbol is (0.5/14) ms.

Table 4 shows the CG period and the offset of the CG period that are determined by using the resource configuration method in this embodiment for XR services with different frame rates. As shown in Table 4:

TABLE 4

| Frame rate (frame period)/CG period | Offset of CG period |
|---|---|
| 30 FPS (1/30 s)/924 symbols | ([1/30 s − 924 symbols]) = 10 symbols |
| 60 FPS (1/60 s)/462 symbols | ([1/60 s − 462 symbols]) = 5 symbols |
| 90 FPS (1/90 s)/308 symbols | ([1/90 s − 308 symbols]) = 4 symbols |
| 120 FPS (1/120 s)/238 symbols | ([1/120 s − 238 symbols]) = −4 symbols |

In Table 4, a frame period of an XR video service with a frame rate of 30 Hz is 1/30 s≈33 ms. A CG period that is closest to 1/30s and that is supported by the standard at 30 kHz is [(1/30s)/(0.5/14)]=924 symbols, and then the offset of the CG period is [1/30s−924 symbols]=10 symbols.

Further, based on the value of the offset of the CG period, values of offsets of CG periods corresponding to different frame rates may be indicated by a plurality of bits. For example, an index (index) 00 indicates a value of an offset of a CG period when a frame rate is 30 Hz, an index 01 indicates a value of an offset of a CG period when a frame rate is 60 Hz, an index 10 indicates a value of an offset of a CG period when a frame rate is 90 Hz, and an index 11 indicates a value of an offset of a CG period when a frame rate is 120 Hz.

In an optional implementation, that the terminal sends the uplink data to the network device based on the second period duration M2 and the reference offset o includes the following steps: the terminal determines the start location of the CG in the second CG period based on the second period duration M2 and the reference offset o; and the terminal sends the uplink data to the network device based on the start location of the CG. Correspondingly, that the network device receives the uplink data from the terminal based on the second period duration M2 and the reference offset o of the start location of the CG in the second CG period includes the following steps: the network device determines the start location of the CG in the second CG period based on the second period duration M2 and the reference offset o; and the network device receives the uplink data from the terminal based on the start location of the CG.

The CG in the second CG period may be identified by j, and j is an integer greater than or equal to zero. The start location of the CG in the second CG period may be obtained in the following two manners:

Manner 1: When the reference offset o of the start location of the CG in the second CG period is carried in second CG configuration information and sent by the network device to the terminal, the start location of the CG in the second CG period meets the following formula:

$$((SFN_2 \times a_2 \times n_2)+(e_2 \times n_2)+y_2)=(R \times a_2 \times n_2+D \times n_2+S+j \times M2+\lceil j \times o \rceil)\bmod(1024 \times a_2 \times n_2) \quad (6)$$

In this formula, $SFN_2$ represents a start system frame number of the CG in the second CG period, $a_2$ represents a quantity of slots included in a system frame, $n_2$ represents a quantity of symbols included in a slot, $e_2$ represents a start slot index of the CG in the second CG period in the system frame $SFN_2$, $y_2$ represents a start symbol index of the CG in the second CG period in the slot $e_2$, R represents a start sent system frame number of a physical uplink shared channel PUSCH configured based on the second CG configuration information, D represents a start sent slot index, in the system frame R, of the PUSCH configured based on the second CG configuration information, S represents a start sent symbol index, in the slot D, of the PUSCH configured based on the second CG configuration information, ⌈ ⌉ represents rounding up to the nearest integer, mod represents a modulo operation, $SFN_2$ $e_2$, and $y_2$ are integers greater than or equal to zero, and $a_2$ and $n_2$ are integers greater than zero.

Manner 2: When the reference offset o of the start location of the CG in the second CG period is carried in DCI and sent by the network device to the terminal, the start location of the CG in the second CG period meets the following formula:

$$((SFN_2 \times a_2 \times n_2)+(e_2 \times n_2)+y_2)=(a_2 \times n_2 \times c+d \times n_2+f+j \times M2+\lceil j \times o \rceil)\bmod(1024 \times a_2 \times n_2) \quad (7)$$

In this formula, $SFN_2$ represents a start system frame number of the CG in the second CG period, $a_2$ represents a quantity of slots included in a system frame, $n_2$ represents a quantity of symbols included in a slot, $e_2$ represents a start slot index of the CG in the second CG period in the system frame $SFN_2$, $y_2$ represents a start symbol index of the CG in the second CG period in the slot $e_2$, c represents a start system frame number of a PUSCH, d represents a start slot index of the PUSCH in the system frame c, f represents a start symbol index of the PUSCH in the slot d, ⌈ ⌉ represents rounding up to the nearest integer, mod represents a modulo operation, $SFN_2$, $e_2$, $y_2$, c, d, and f are integers greater than or equal to zero, and $a_2$ and $n_2$ are integers greater than zero.

The reference offset o is in a unit of symbols. It should be understood that when the unit of the reference offset o is milliseconds, o in the formulas in the manner 1 and the manner 2 may be replaced with "o/r", where r represents a time length (in a unit of ms) of one symbol.

Figure 7:
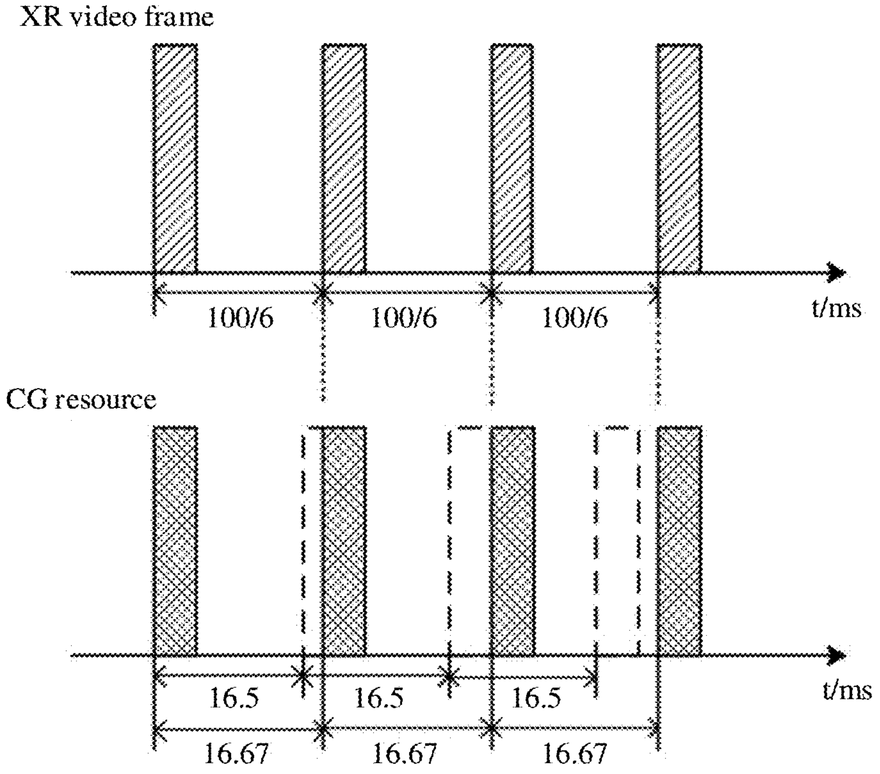
FIG. 7 is a schematic diagram of another CG resource distribution for matching an XR service according to an embodiment.

FIG. 7 is a schematic diagram of CG distribution for matching an XR service according to an embodiment. As shown in FIG. 7, an inter-frame space of XR video frames at arrival moments is 100/6 ms. Determined according to the method 600, a CG period is 462 symbols (16.5 ms), an offset of the CG period is 5 symbols (1/3 ms), a start location of the first CG is an arrival moment of the first XR service, that is, 0 symbols, a start location of the second CG is 462 symbols+5 symbols=467 symbols (16.67 ms), which is after an arrival moment of the second XR service, and a start location of the third CG is 467 symbols+467 symbols+10 symbols=944 symbols (33.34 ms), which is after an arrival moment of the third XR service.

The method 600 is described by using the CG configuration as an example. It should be understood that, for a configuration manner of SPS, refer to the configuration manner of the CG in the method 600. Details are not described herein again. Similarly, SPS in a second SPS period may be identified by $j_1$ and $j_1$ is an integer greater than or equal to zero. The start location of the SPS in the second SPS period meets the following formula:

$$(SFN_5 \times a_5+b_5)=[(a_5 \times c_4+d_4)+j_1 \times P2 \times a_5/10+\lceil j_1 \times o1/s \rceil \times s \times a_5/10]\bmod(1024 \times a_5) \quad (8)$$

In this formula, $SFN_5$ represents a start system frame number of the SPS in the second SPS period, $a_5$ represents a quantity of slots included in a system frame, $b_5$ represents a start slot index of the SPS in the second SPS period in the system frame $SFN_5$, $c_4$ represents a start system frame number of a PDSCH, $d_4$ represents a start slot index of the PDSCH in the slot d, P2 represents second period duration of the second SPS, s represents a time length (in a unit of ms) of one slot, of represents an offset (in a unit of ms) determined based on a frame rate, ⌈ ⌉ represents rounding up to the nearest integer, mod represents a modulo operation, $SFN_5$, $b_5$, $c_4$, and $d_4$ are integers greater than or equal to zero, and $a_5$ and P2 are integers greater than zero.

An embodiment further provides still another resource configuration method. A terminal obtains third period duration M3 of a third CG period based on third CG configuration or DCI sent by a network device and sends uplink data to the network device based on the third period duration M3. This effectively reduces a transmission delay of a to-be-transmitted service and improves system performance.

Figure 8:
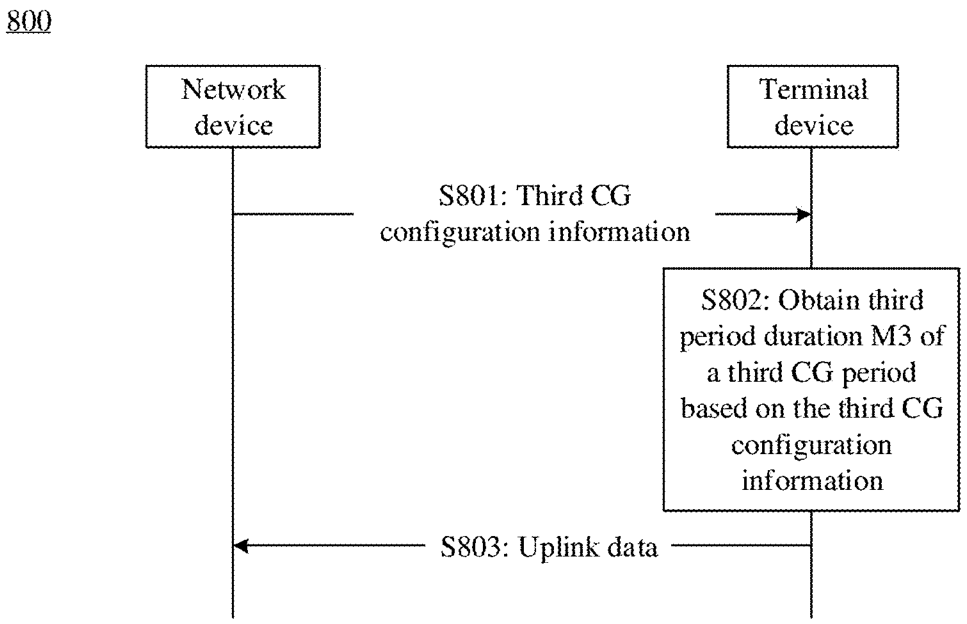
FIG. 8 is a schematic flowchart of still another resource configuration method according to an embodiment.

The following describes in detail still another resource configuration method 800 provided in an embodiment with reference to FIG. 8. The method 800 may be applied to the communication system 100 shown in FIG. 1, but this embodiment is not limited thereto. In FIG. 8, the method is illustrated by using an example in which a network device and a terminal serve as execution bodies of the interaction illustration, but the embodiment may not limit the execution bodies of the interaction illustration. For example, the network device in FIG. 8 may alternatively be a chip, a chip system, or a processor that supports the network device in implementing the method or may be a logic module or software that can implement all or some functions of the network device. The terminal in FIG. 8 may alternatively be a chip, a chip system, or a processor that supports the terminal in implementing the method or may be a logic module or software that can implement all or some functions of the terminal.

FIG. 8 shows still another resource configuration method 800 according to an embodiment. As shown in FIG. 8, the method 800 may include the following steps:

S801: A network device sends third CG configuration information to a terminal. Correspondingly, the terminal device receives the third CG configuration information. Alternatively, a network device sends DCI to a terminal. Correspondingly, the terminal device receives the DCI.

S802: The terminal obtains third period duration M3 of a third CG period based on the third CG configuration information, where M3 is greater than zero. Alternatively, the terminal obtains third period duration M3 of a third CG period based on the DCI.

S803: The terminal sends uplink data to the network device based on the third period duration M3. Correspondingly, the network device receives the uplink data based on the third period duration M3.

The following describes in detail a process of determining a CG period with reference to Table 5 using an example in which a CG period with subcarrier spacing of 30 kHz is two symbols, seven symbols, or (1-1280)×14 symbols. It should be understood that a slot length of each slot at 30 kHz is 0.5 ms, each slot includes 14 symbols, and a symbol length of each symbol is (0.5/14) ms.

Table 5 shows CG periods corresponding to different frame rates (inter-frame spaces) of an XR service. As shown in Table 5:

TABLE 5

| Frame rate (FPS)/Frame period (ms) | CG period (symbol) |
|---|---|
| 30/(1/30) | ⌈1/30/(0.5/14) × 1000⌉ = 934 |
| 60/(1/60) | ⌈1/60/(0.5/14) × 1000⌉ = 467 |
| 90/(1/90) | ⌈1/90/(0.5/14) × 1000⌉ = 312 |
| 120/(1/120) | ⌈1/120/(0.5/14) × 1000⌉ = 234 |

Before S801, in this embodiment, CG periods of 934 symbols, 467 symbols, 312 symbols, and 234 symbols may be added to the CG period configuration according to the correspondence in Table 5.

In an optional implementation, that the terminal sends the uplink data to the network device based on the third period duration M3 includes the following steps: the terminal determines a start location of a CG in the third CG period based on the third period duration M3; and the terminal sends the uplink data to the network device based on the start location of the CG. Correspondingly, that the network device receives the uplink data from the terminal based on the third period duration M3 includes the following steps: the network device determines a start location of a CG in the third CG period based on the third period duration M3; and the network device receives the uplink data from the terminal based on the start location of the CG.

For example, when a start location of an $i^{th}$ CG is converted to an integer multiple of a CG-supported symbol offset, rounding up to the nearest integer may be performed to ensure a symbol of the CG located at or after an arrival moment of an XR video frame.

The CG in the third CG period may be identified by k, and k is an integer greater than or equal to zero. The start location of the CG may be obtained in the following two manners:

Manner 1: When the third period duration M3 of the third CG period is carried in third CG configuration information and sent by the network device to the terminal, the start location of the CG meets the following formula:

$$[(\mathrm{SFN}_3\times a_3\times n_3)+(e_3\times n_3)+y_3]=(R_2\times a_3\times n_3+D_2\times n_3+S_2+k\times M3)\bmod(1024\times a_3\times n_3) \quad (9)$$

In this formula, $SFN_3$ represents a start system frame number of the third CG period, $a_3$ represents a quantity of slots included in a system frame, $n_3$ represents a quantity of symbols included in a slot, $e_3$ represents a start slot index of the CG in the third CG period in the system frame $SFN_3$, $y_3$ represents a start symbol index of the CG in the third CG period in the slot $e_3$, $R_2$ represents a start system frame number of a PUSCH configured based on the third CG configuration information, $D_2$ represents a start slot index, in the system frame $R_2$, of the PUSCH configured based on the third CG configuration information, $S_2$ represents a start symbol index, in the slot $D_2$, of the PUSCH configured based on the third CG configuration information, ⌈ ⌉ represents rounding up to the nearest integer, mod represents a modulo operation, $SFN_3$, $e_3$, $y_3$, $R_2$, $D_2$, and $S_2$ are integers greater than or equal to zero, and $a_3$ and $n_3$ are integers greater than zero.

Manner 2: When the third period duration M3 of the third CG period is carried in DCI and sent by the network device to the terminal, the start location of the CG meets the following formula:

$$[(\mathrm{SFN}_3\times a_3\times n_3)+(e_3\times n_3)+y_3]=[(c_2\times a_3\times n_3+d_2\times n_3+f_2)+k\times M3]\bmod(1024\times a_3\times n_3) \quad (10)$$

In this formula, $SFN_3$ represents a start system frame number of the third CG period, $a_3$ represents a quantity of slots included in a system frame, $n_3$ represents a quantity of symbols included in a slot, $e_3$ represents a start slot index of the CG in the third CG period in the system frame $SFN_3$, $y_3$ represents a start symbol index of the CG in the third CG period in the slot $e_3$, $c_4$ represents a start system frame number of a PUSCH, $d_4$ represents a start slot index of the PUSCH in the system frame $c_4$, $f_4$ represents a start symbol index of the PUSCH in the slot $d_4$, ⌈ ⌉ represents rounding up to the nearest integer, mod represents a modulo operation, $SFN_3$ $e_3$, $y_3$, $c_4$, $d_4$, and $f_4$ are integers greater than or equal to zero, and $a_3$ and $n_3$ are integers greater than zero.

The method 800 is described by using the CG configuration as an example. It should be understood that, for a configuration manner of SPS, refer to the configuration manner of the CG in the method 800. Details are not described herein again. Similarly, SPS in a third SPS period may be identified by $k_1$, and $k_1$ is an integer greater than or equal to zero. The start location of the SPS in the third SPS period meets the following formula:

$$(\mathrm{SFN}_6 \times a_6 \times n_6) = \lceil (c_5 \times a_6 + d_5) + k_1 \times P3 \times a_6 / 10 \rceil \bmod (1024 \times a_6) \tag{11}$$

In this formula, $SFN_6$ represents a start system frame number of the SPS in the third SPS period, $a_6$ represents a quantity of slots included in a system frame, $b_6$ represents a start slot index of the SPS in the third SPS period in the system frame $SFN_6$, $c_5$ represents a start system frame number of a PDSCH, $c_4$ represents a start slot index of the PDSCH in the system frame $c_5$, P3 represents third period duration of the third SPS period, $\lceil\ \rceil$ represents rounding up to the nearest integer, mod represents a modulo operation, $SFN_6$, $b_6$, $c_5$, and $c_4$ are integers greater than or equal to zero, and $a_6$ and P3 are integers greater than zero.

It should be understood that the "embodiment" means that particular features, structures, or characteristics related to the embodiment are included in at least one embodiment. Therefore, the embodiments do not necessarily refer to a same embodiment. In addition, these particular features, structures, or characteristics may be combined in one or more embodiments in any appropriate manner.

It should be further understood that sequence numbers of the foregoing processes do not mean a sequence of performing the processes. The sequence of performing the processes should be determined based on functions and internal logic of the processes and should not be construed as any limitation on the implementation processes of embodiments.

The foregoing describes in detail the resource configuration method in the embodiments with reference to FIG. 4 to FIG. 8. The following describes in detail a communication apparatus in the embodiments with reference to FIG. 9 and FIG. 10.

Figure 9:
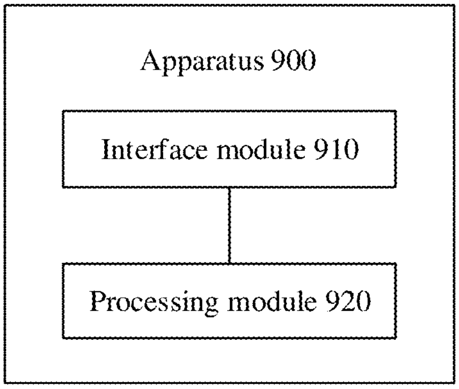
FIG. 9 is a schematic block diagram of a communication apparatus according to an embodiment.

FIG. 9 shows a communication apparatus 900 according to an embodiment. The apparatus 900 may include an interface module 910 and a processing module 920.

The apparatus 900 has a function of implementing the terminal described in embodiments. For example, the apparatus 900 includes a corresponding module, unit, or means for the terminal to perform the steps related to the terminal described in embodiments. The function, unit, or means may be implemented by software or hardware, or may be implemented by hardware executing corresponding software, or may be implemented by a combination of software and hardware.

Alternatively, the apparatus 900 has a function of implementing the network device described in embodiments. For example, the apparatus 900 includes a corresponding module, unit, or means for the network device to perform the steps related to the network device described in embodiments. The function, unit, or means may be implemented by software or hardware, or may be implemented by hardware executing corresponding software, or may be implemented by a combination of software and hardware.

In a possible implementation, the apparatus 900 may be a terminal, or may be a component (like an integrated circuit or a chip) of a terminal.

The interface module 910 is configured to receive first CG configuration information from a network device; and the processing module 920 is configured to obtain first period duration M1 of a first CG period based on the first CG configuration information, where M1 is greater than zero; obtain a quantity X of CGs in the first CG period, where X is an integer greater than zero; and control the interface module 910 to send uplink data to the network device based on the first period duration M1 and the quantity X of the CGs.

Optionally, the processing module 920 is further configured to: determine a start location of at least one CG in the first CG period based on the first period duration M1 and the quantity X of the CGs; and control the interface module to send the uplink data to the network device based on the start location of the at least one CG in the first CG period.

Optionally, a start location of an $i^{th}$ CG in the first CG period meets the following formula:

$$((\mathrm{SFN}_i \times a \times n) + (e \times n) + g_i) = ((\mathrm{SFN} \times a \times n) + (e \times n) + y + \lceil (i-1) \times M1 / X \rceil) \bmod (1024 \times a \times n)$$

In this formula, $SFN_1$ represents a start system frame number of the first CG period, a represents a quantity of slots included in a system frame, n represents a quantity of symbols included in a slot, e represents a start slot index of the first CG period in the system frame SFN y represents a start symbol index of the first CG period in the slot e, SFN represents a start system frame number of the $i^{th}$ CG in the first CG period, $e_i$ represents a start slot index of the $i^{th}$ CG in the first CG period in the system frame SFN $g_i$ represents a start symbol index of the $i^{th}$ CG in the first CG period in the slot $e_i$, i=1, 2, . . . , X, $\lceil\ \rceil$ represents rounding up to the nearest integer, mod represents a modulo operation, $SFN_1$, e, y, $SFN_i$, $e_i$, and $g_i$ are integers greater than or equal to zero, and a and n are integers greater than zero.

Optionally, the processing module 920 is further configured to: obtain the quantity X of the CGs in the first CG period based on the first CG configuration information.

Optionally, the processing module 920 is further configured to: obtain the quantity X of the CGs in the first CG period based on downlink control information DCI.

The interface module 910 may be configured to receive second CG configuration information from a network device; and the processing module 920 is configured to obtain second period duration M2 of a second CG period based on the second CG configuration information, where M2 is greater than zero; obtain a reference offset o of a start location of a CG in the second CG period; and control the interface module 910 to send uplink data to the network device based on the second period duration M2 and the reference offset o.

Optionally, the processing module 920 is further configured to: determine the start location of the CG in the second CG period based on the second period duration M2 and the reference offset o; and control the interface module to send the uplink data to the network device based on the start location of the CG.

Optionally, the processing module 920 is further configured to: obtain the reference offset o of the start location of the CG in the second CG period based on the second CG configuration information. The CG in the second CG period is identified by j, and j is an integer greater than or equal to zero. The start location of the CG in the second CG period meets the following formula:

$$((\mathrm{SFN}_2 \times a_2 \times n_2) + (e_2 \times n_2) + y_2) = (R \times a_2 \times n_2 + D \times n_2 + S + j \times M2 + \lceil j \times o \rceil) \bmod (1024 \times a_2 \times n_2)$$

In this formula, $SFN_2$ represents a start system frame number of the CG in the second CG period, $a_2$ represents a quantity of slots included in a system frame, $n_2$ represents a quantity of symbols included in a slot, $e_2$ represents a start slot index of the CG in the second CG period in the system frame $SFN_2$, $y_2$ represents a start symbol index of the CG in the second CG period in the slot $e_2$, R represents a start system frame number of a physical uplink shared channel PUSCH configured based on the second CG configuration information, D represents a start slot index, in the system frame R, of the PUSCH configured based on the second CG configuration information, S represents a start symbol index, in the slot D, of the PUSCH configured based on the second CG configuration information, $\lceil\ \rceil$ represents rounding up to the nearest integer, mod represents a modulo operation, $SFN_2$, $e_2$, and $y_2$ are integers greater than or equal to zero, and $a_2$ and $n_2$ are integers greater than zero.

Optionally, the processing module 910 is further configured to: obtain the reference offset o of the start location of the CG in the second CG period based on downlink control information DCI. The CG in the second CG period is identified by j, and j is an integer greater than or equal to zero. The start location of the CG in the second CG period meets the following formula:

$$((SFN_2 \times a_2 \times n_2)+(e_2 \times n_2)+y_2)=(a_2 \times n_2 \times c+d \times n_2+f+j \times M2+\lceil j \times o \rceil) \bmod (1024 \times a_2 \times n_2)$$

In this formula, $SFN_2$ represents a start system frame number of the CG in the second CG period, $a_2$ represents a quantity of slots included in a system frame, $n_2$ represents a quantity of symbols included in a slot, $e_2$ represents a start slot index of the CG in the second CG period in the system frame $SFN_2$, $y_2$ represents a start symbol index of the CG in the second CG period in the slot $e_2$, c represents a start system frame number of a PUSCH, d represents a start slot index of the PUSCH in the system frame c, f represents a start symbol index of the PUSCH in the slot d, $\lceil\ \rceil$ represents rounding up to the nearest integer, mod represents a modulo operation, $SFN_2$, $e_2$, $y_2$, c, d, and f are integers greater than or equal to zero, and $a_2$ and $n_2$ are integers greater than zero.

In this embodiment, the network device sends the CG configuration information to the terminal, so that the terminal can obtain the first period duration of the CG period and the quantity of the CGs in the first CG period based on the configuration information, and send the uplink data to the network device based on the first period duration and the quantity of the CGs. In this case, each CG may appear at or after an arrival moment of a to-be-transmitted service. The method can better match a transmission service that arrives periodically based on a frame rate, thereby effectively reducing a transmission delay of this type of service and improving system performance.

In another possible implementation, the apparatus 900 may be a network device, or may be a component (like an integrated circuit or a chip) of a network device.

The interface module 910 may be configured to: send information about first period duration M1 of a first CG period and information about a quantity X of CGs in the first CG period to a terminal, where M1 is greater than zero, and X is an integer greater than zero; and receive uplink data from the terminal based on the first period duration M1 and the quantity X of the CGs in the first CG period.

Optionally, the interface module 910 is further configured to: send first CG configuration information to the terminal, where the first CG configuration information includes the information about the first period duration M1 of the first CG period and the information about the quantity X of the CGs in the first CG period.

Optionally, the interface module 910 is further configured to: send first CG configuration information and DCI to the terminal, where the first CG configuration information includes the information about the first period duration M1 of the first CG period, and the DCI includes the information about the quantity X of the CGs in the first CG period.

Optionally, the processing module 920 is further configured to: determine a start location of at least one CG in the first CG period based on the first period duration M1 and the quantity X of the CGs in the first CG period; and the interface module 910 is further configured to: receive the uplink data from the terminal based on the start location of the at least one CG in the first CG period.

Optionally, a start location of an $i^{th}$ CG in the first CG period meets the following formula:

$$((SFN_i \times a \times n)+(e_i \times n)+g_i)=((SFN_1 \times a \times n)+(e \times n)+y+\lceil (i-1) \times M1/X \rceil) \bmod (1024 \times a \times n)$$

In this formula, $SFN_1$ represents a start system frame number of the first CG period, a represents a quantity of slots included in a system frame, n represents a quantity of symbols included in a slot, e represents a start slot index of the first CG period in the system frame $SFN_1$, y represents a start symbol index of the first CG period in the slot e, $SFN_i$ represents a start system frame number of the $i^{th}$ CG in the first CG period, $e_i$ represents a start slot index of the $i^{th}$ CG in the first CG period in the system frame $SFN_i$, $g_i$ represents a start symbol index of the $i^{th}$ CG in the first CG period in the slot $e_i$, i=1, 2, . . . , X, $\lceil\ \rceil$ represents rounding up to the nearest integer, mod represents a modulo operation, $SFN_1$, e, y, $SFN_i$, $e_i$, and $g_i$ are integers greater than or equal to zero, and a and n are integers greater than zero.

The interface module 910 may be configured to: send information about second period duration M2 of a second CG period and information about a reference offset o of a start location of a CG in the second CG period to a terminal, where M2 is greater than zero; and receive uplink data from the terminal based on the second period duration M2 and the reference offset o of the start location of the CG in the second CG period.

Optionally, the processing module 920 is further configured to: determine the start location of the CG in the second CG period based on the second period duration M2 and the reference offset o; and the interface module 920 is further configured to: receive the uplink data from the terminal based on the start location of the CG.

Optionally, the interface module 910 is further configured to: send second CG configuration information to the terminal, where the second CG configuration information includes the information about the second period duration M2 of the second CG period and the information about the reference offset o of the start location of the CG in the second CG period. The CG in the second CG period is identified by j, and j is an integer greater than or equal to zero. The start location of the CG in the second CG period meets the following formula:

$$((SFN_2 \times a_2 \times n_2)+(e_2 \times n_2)+y_2)=(R \times a_2 \times n_2+D \times n_2+S+j \times M2+\lceil j \times o \rceil) \bmod (1024 \times a_2 \times n_2)$$

In this formula, $SFN_2$ represents a start system frame number of the CG in the second CG period, $a_2$ represents a quantity of slots included in a system frame, $n_2$ represents a quantity of symbols included in a slot, $e_2$ represents a start slot index of the CG in the second CG period in the system frame $SFN_2$, $y_2$ represents a start symbol index of the CG in the second CG period in the slot $e_2$, R represents a start sent system frame number of a physical uplink shared channel PUSCH configured based on the second CG configuration information, D represents a start sent slot index, in the system frame R, of the PUSCH configured based on the second CG configuration information, S represents a start sent symbol index, in the slot D, of the PUSCH configured based on the second CG configuration information, $\lceil\ \rceil$ represents rounding up to the nearest integer, mod represents a modulo operation, $SFN_2$, $e_2$, and $y_2$ are integers greater than or equal to zero, and $a_2$ and $n_2$ are integers greater than zero.

Optionally, the interface module 910 is further configured to: send second CG configuration information and DCI to the terminal, where the second CG configuration information includes the information about the second period duration M2 of the second CG period, and the DCI includes the information about the reference offset o of the start location of the CG in the second CG period. The CG in the second CG period is identified by j, and j is an integer greater than or equal to zero. The start location of the CG in the second CG period meets the following formula:

$$((SFN_2 \times a_2 \times n_2)+(e_2 \times n_2)+y_2)=(a_2 \times n_2 \times c+d \times n_2+f+j \times M2+\lceil j \times o \rceil)\bmod(1024 \times a_2 \times n_2)$$

In this formula, $SFN_2$ represents a start system frame number of the CG in the second CG period, $a_2$ represents a quantity of slots included in a system frame, $n_2$ represents a quantity of symbols included in a slot, $e_2$ represents a start slot index of the CG in the second CG period in the system frame $SFN_2$, $y_2$ represents a start symbol index of the CG in the second CG period in the slot $e_2$, c represents a start sent system frame number of a physical uplink shared channel PUSCH, d represents a start sent slot index of the PUSCH in the system frame c, f represents a start sent symbol index of the PUSCH in the slot d, ⌈ ⌉ represents rounding up to the nearest integer, mod represents a modulo operation, SEN, $e_2$, $y_2$, c, d, and f are integers greater than or equal to zero, and $a_2$ and $n_2$ are integers greater than zero.

In this embodiment, the terminal obtains the first period duration of the second CG period and the reference offset o of the start location of the CG in the second CG period based on second CG configuration or the second CG configuration information and downlink control information that are sent by the network device, and sends the uplink data to the network device based on the second period duration and the reference offset o (in a unit of symbols) of the start location of the CG in the second CG period. According to the resource configuration method, the CG may appear at or after an arrival moment of a to-be-transmitted service (that is, the uplink data). The method can better match a transmission service that arrives periodically based on a frame rate, thereby effectively reducing a transmission delay of this type of service and improving system performance.

It should be understood that the communication apparatus 900 herein is embodied in a form of a functional module. The term "module" herein may be an application-specific integrated circuit (ASIC), an electronic circuit, a processor (like a shared processor, a dedicated processor, or a group processor) configured to execute one or more software or firmware programs, a memory, a combinational logic circuit, and/or another suitable component that supports the described function.

The communication apparatus 900 has a function of implementing corresponding steps performed by the terminal or the network device in the method 400, the method 600, or the method 800. The foregoing function may be implemented by hardware or may be implemented by hardware executing corresponding software. The hardware or the software includes one or more modules corresponding to the function.

In this embodiment, the communication apparatus 900 in FIG. 9 may alternatively be a chip or a chip system, for example, a system on chip (SoC). This is not limited.

Figure 10:
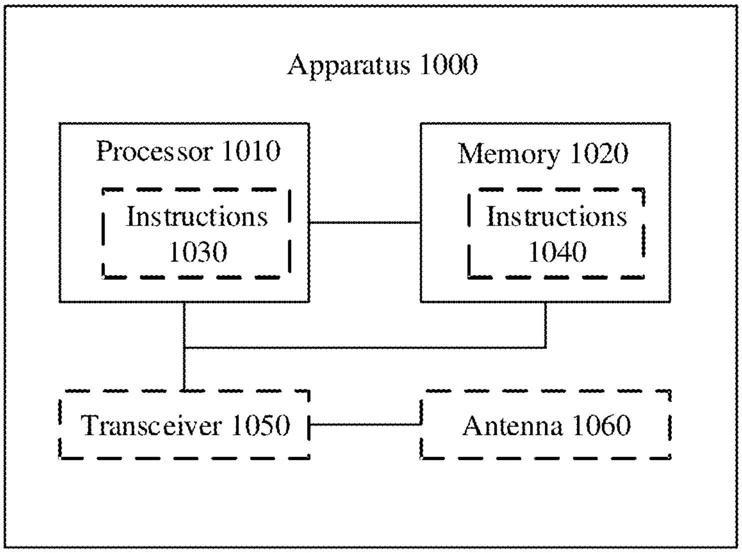
FIG. 10 is a schematic block diagram of a communication apparatus according to an embodiment.

FIG. 10 shows another communication apparatus 1000 according to an embodiment. The apparatus 1000 may be a network device, or may be a terminal device, or may be a chip, a chip system, a processor, or the like that supports a network device in implementing the foregoing method, or may be a chip, a chip system, a processor, or the like that supports a terminal device in implementing the foregoing method. The apparatus 1000 may be configured to implement the method 400, the method 600, or the method 800 described in the foregoing method embodiments. For details, refer to the description in the foregoing method embodiments.

The apparatus 1000 may include one or more processors 1010. The processor 1010 may also be referred to as a processing unit and can implement a control function. The processor 1010 may be a general-purpose processor, a dedicated processor, or the like, for example, may be a baseband processor or a central processing unit. The baseband processor may be configured to process a communication protocol and communication data. The central processing unit may be configured to control a communication apparatus (like a base station, a baseband chip, a terminal, a terminal chip, a DU, or a CU), execute a software program, and process data of the software program.

The processor 1010 may also store instructions (and/or data) 1030, and the instructions and/or data 1030 may be run by the processor, so that the apparatus 1000 performs the method described in the foregoing method embodiments.

The processor 1010 may include a transceiver unit configured to implement a receiving function and a sending function. For example, the transceiver unit may be a transceiver circuit, an interface, or an interface circuit. The transceiver circuit, the interface, or the interface circuit configured to implement the receiving function and the sending function may be separated or may be integrated together. The transceiver circuit, the interface, or the interface circuit may be configured to read and write code/data. Alternatively, the transceiver circuit, the interface, or the interface circuit may be configured to transmit or transfer a signal.

Optionally, the apparatus 1000 may include one or more memories 1020, storing instructions 1040. The instructions may be run on the processor, so that the apparatus 1000 performs the method described in the foregoing method embodiments. Optionally, the memory 1020 may further store data. Optionally, the processor 1010 may also store instructions and/or data. The processor 1010 and the memory 1020 may be separately disposed or may be integrated together. For example, the correspondence described in the foregoing method embodiments may be stored in the memory or stored in the processor.

Optionally, the apparatus 1000 may further include a transceiver 1050 and/or an antenna 1060. The transceiver 1050 may be referred to as a transceiver unit, a transceiver machine, a transceiver circuit, or a transceiver, and is configured to implement receiving and sending functions.

One or more modules in FIG. 9 may be implemented by one or more processors or may be implemented by one or more processors and one or more memories or may be implemented by one or more processors and one or more transceivers, or may be implemented by one or more processors, one or more memories, and one or more transceivers. This is not limited in the embodiments. The processor, the memory, and the transceiver may be separately disposed or may be integrated.

In an implementation process, the steps of the method in the foregoing embodiments may be implemented by using a hardware integrated logic circuit in the processor, or by using instructions in a form of software. The steps of the method with reference to the embodiments may be directly performed by a hardware processor or may be performed by a combination of hardware and software modules in the processor. The software module may be located in a storage medium mature in the art, like a random access memory, a flash memory, a read-only memory, a programmable read-only memory, an electrically erasable programmable memory, or a register. The storage medium is located in the memory. The processor executes instructions in the memory and completes the steps in the foregoing method in combination with hardware of the processor. To avoid repetition, details are not described herein again.

The processor and the transceiver may be implemented on an integrated circuit (IC), an analog IC, a radio frequency integrated circuit RFIC, a hybrid signal IC, an application-specific integrated circuit (ASIC), a printed circuit board (PCB), an electronic device, or the like. The processor and the transceiver may be manufactured by using various IC technologies, such as a complementary metal oxide semiconductor (CMOS), an N-type metal oxide semiconductor (NMOS), a positive channel metal oxide semiconductor (PMOS), a bipolar junction transistor (BJT), a bipolar CMOS (BiCMOS), silicon germanium (SiGe), and gallium arsenide (GaAs).

The embodiment described in the foregoing embodiments may be a network device or a terminal device. However, the scope of the embodiments is not limited thereto, and a structure of the apparatus may not be limited by that in FIG. 10. The apparatus may be an independent device or may be a part of a larger device. For example, the apparatus may be:

(1) an independent integrated circuit IC, or a chip, or a chip system or subsystem;

(2) a set of one or more ICs, where optionally, the set of ICs may also include a storage component configured to store data and/or instructions;

(3) an ASIC, for example, a modem (MSM);

(4) a module that can be embedded in another device;

(5) a receiver, a terminal, an intelligent terminal, a cellular phone, a wireless device, a handheld device, a mobile unit, an on-board device, a network device, a cloud device, or an artificial intelligence device; or (6) another device.

It may be understood that, in some scenarios, some optional features in the embodiments may be independently implemented without depending on another feature, for example, a solution on which the optional features are currently based, to resolve a corresponding problem and achieve corresponding effect or may be combined with other features based on requirements in some scenarios. Correspondingly, the apparatus provided in the embodiments may also correspondingly implement these features or functions. Details are not described herein.

It should be understood that the processor in the embodiments may be an integrated circuit chip and has a signal processing capability. In an implementation process, the steps in the foregoing method embodiments may be implemented by using a hardware integrated logic circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component.

The embodiments may be implemented in various manners. For example, the embodiments may be implemented by hardware, software, or a combination thereof. For hardware implementation, a processing unit configured to perform these technologies at a communication apparatus (like a base station, a terminal, a network entity, or a chip) may be implemented in one or more general-purpose processors, a DSP, a digital signal processing device, an ASIC, a programmable logic device, an FPGA or another programmable logic apparatus, a discrete gate or transistor logic, a discrete hardware component, or any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

It may be understood that the memory in the embodiments may be a volatile memory or a non-volatile memory or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. By way of example and not limitation, RAMs in many forms may be used, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the system and method includes, but is not limited to, these and any memory of another appropriate type.

The embodiment further provides a non-transitory computer-readable medium storing a computer program. When the computer program is executed by a computer, functions of any one of the foregoing method embodiments are implemented.

The embodiment further provides a computer program product. When the computer program product is executed by a computer, functions of any one of the foregoing method embodiments are implemented.

All or some of the foregoing embodiments may be implemented by software, hardware, firmware, or any combination thereof. When implemented by software, all or some of the embodiments may be implemented in a form of a computer program product. The computer program product includes one or more computer instructions. When the computer instructions are loaded and executed on a computer, all or some of the procedures or functions according to the embodiments are generated. The computer may be a general-purpose computer, a dedicated computer, a computer network, or another programmable apparatus. The computer instructions may be stored in a non-transitory computer-readable storage medium or may be transmitted from a non-transitory computer-readable storage medium to another non-transitory computer-readable storage medium. For example, the computer instructions may be transmitted from a website, computer, server, or data center to another web site, computer, server, or data center in a wired (for example, a coaxial cable, an optical fiber, or a digital subscriber line (digital subscriber line, DSL)) or wireless (for example, infrared, radio, or microwave) manner. The non-transitory computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a high-density digital video disc (DVD)), a semiconductor medium (for example, a solid-state drive (SSD)), or the like.

A person of ordinary skill in the art may be aware that, in combination with the examples described in the embodiments, units and algorithm steps can be implemented by electronic hardware or a combination of computer software and electronic hardware. Whether the functions are performed by hardware or software depends on particular applications. A person skilled in the art may use different methods to implement the described functions for each particular application, but it should not be considered that the implementation goes beyond the scope of the embodiments.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments, it should be understood that the system, apparatus, and method may be implemented in another manner. For example, the described apparatus embodiments are merely examples. For example, division into the units is merely logical function division and may be other division during actual implementation. For example, a plurality of units or components may be combined or integrated into another system, or some features may be omitted or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the embodiments.

In addition, functional units in the embodiments may be integrated into one processing unit, each of the units may exist alone physically, or two or more units are integrated into one unit.

When the functions are implemented in the form of a software functional unit and sold or used as an independent product, the functions may be stored in a non-transitory computer-readable storage medium. Based on such an understanding, the embodiments may be implemented in a form of a software product. The computer software product is stored in a storage medium and includes several instructions for instructing a computer device (which may be a personal computer, a server, a network device, or the like) to perform all or some of the steps of the method described in the embodiments. The foregoing storage medium includes any medium that can store program code, like a USB flash drive, a removable hard disk drive, a ROM, a RAM, a magnetic disk, or an optical disc.

The foregoing descriptions are merely embodiments but are not intended as limiting. Any variation or replacement readily figured out by a person skilled in the art shall fall within the scope of the embodiments.

What is claimed is:

1. A method comprising:

receiving first configured grant (CG) configuration information from a network device;

obtaining first period duration M1 of a first CG period based on the first CG configuration information, wherein M1 is greater than zero;

obtaining a quantity X of CGs in the first CG period, wherein X is an integer greater than zero; and sending uplink data to the network device based on the first period duration M1 and the quantity X of the CGs, wherein:

a start location of an $i^{th}$ CG in the first CG period meets the following formula:

$$((SFN_i \times a \times n)+(e_i \times n)+g_i)=((SFN \times a \times n)+(e \times n)+y+\lceil (i-1) \times M1/X \rceil) \bmod (1024 \times a \times n)$$

$SFN_1$ represents a start system frame number of the first CG period, a represents a quantity of slots comprised in a system frame, n represents a quantity of symbols comprised in a slot, e represents a start slot index of the first CG period in the system frame $SFN_1$, y represents a start symbol index of the first CG period in the slot e, $SFN_i$ represents a start system frame number of the $i^{th}$ CG in the first CG period, $e_i$ represents a start slot index of the $i^{th}$ CG in the first CG period in the system frame $SFN_i$, $g_i$ represents a start symbol index of the $i^{th}$ CG in the first CG period in the slot $e_i$, i=1, 2, . . . , X, $\lceil\ \rceil$ represents rounding up to the nearest integer, mod represents a modulo operation, $SFN_1$, e, y, $SFN_i$, $e_i$, and $g_i$ are integers greater than or equal to zero, and a and n are integers greater than zero.

2. The method according to claim 1, wherein sending the uplink data to the network device based on the first period duration M1 and the quantity X of the CGs further comprises:

determining a start location of at least one CG in the first CG period based on the first period duration M1 and the quantity X of the CGs; and sending the uplink data to the network device based on the start location of the at least one CG in the first CG period.

3. The method according to claim 1, wherein obtaining the quantity X of CGs in the first CG period further comprises:

obtaining the quantity X of the CGs in the first CG period based on the first CG configuration information.

4. The method according to claim 1, wherein obtaining the quantity X of CGs in the first CG period further comprises:

obtaining the quantity X of the CGs in the first CG period based on downlink control information (DCI).

5. The method according to claim 1, wherein the network device comprises a core network device and a radio access network device.

6. The method according to claim 5, wherein the core network device and the radio access network device are independent and different physical devices.

7. The method according to claim 5, wherein functions of the core network device and the radio access network device are integrated into a same physical device.

8. The method according to claim 1, wherein SPS transmission is provided for downlink transmission and CG transmission is provided for uplink transmission.

9. A method comprising:

receiving second configured grant (CG) configuration information from a network device;

obtaining second period duration M2 of a second CG period based on the second CG configuration information, wherein M2 is greater than zero;

obtaining a reference offset o of a start location of a CG in the second CG period; and sending uplink data to the network device based on the second period duration M2 and the reference offset o, wherein the start location of the CG in the second CG period meets the following formula:

$$((\mathrm{SFN}_2 \times a_2 \times n_2)+(e_2 \times n_2)+y_2)=(R \times a_2 \times n_2+D \times n_2+S+j \times M2+\lceil j \times o \rceil) \bmod (1024 \times a_2 \times n_2)$$

$SFN_2$ represents a start system frame number of the CG in the second CG period, $a_2$ represents a quantity of slots comprised in a system frame, $n_2$ represents a quantity of symbols comprised in a slot, $e_2$ represents a start slot index of the CG in the second CG period in the system frame $SFN_2$, $y_2$ represents a start symbol index of the CG in the second CG period in the slot $e_2$, R represents a start system frame number of a physical uplink shared channel (PUSCH) configured based on the second CG configuration information, D represents a start slot index, in the system frame R, of the PUSCH configured based on the second CG configuration information, S represents a start symbol index, in the slot D, of the PUSCH configured based on the second CG configuration information, $\lceil\ \rceil$ represents rounding up to the nearest integer, mod represents a modulo operation, $SFN_2$, $e_2$, and $y_2$ are integers greater than or equal to zero, and $a_2$ and $n_2$ are integers greater than zero.

10. The method according to claim 9, wherein sending the uplink data to the network device based on the second period duration M2 and the reference offset o further comprises:

determining the start location of the CG in the second CG period based on the second period duration M2 and the reference offset o; and sending the uplink data to the network device based on the start location of the CG.

11. The method according to claim 10, wherein obtaining the reference offset o of the start location of the CG in the second CG period further comprises:

obtaining the reference offset o of the start location of the CG in the second CG period based on the second CG configuration information, wherein the CG in the second CG period is identified by j, and j is an integer greater than or equal to zero $$((\mathrm{SFN}_2 \times a_2 \times n_2)+(e_2 \times n_2)+y_2)=(R \times a_2 \times n_2+D \times n_2+S+j \times M2+\lceil j \times o \rceil) \bmod (1024 \times a_2 \times n_2)$$

12. The method according to claim 10, wherein obtaining the reference offset o of the start location of the CG in the second CG period further comprises:

obtaining the reference offset o of the start location of the CG in the second CG period based on downlink control information (DCI), wherein the CG in the second CG period is identified by j, and j is an integer greater than or equal to zero $$((\mathrm{SFN}_2 \times a_2 \times n_2)+(e_2 \times n_2)+y_2)=(a_2 \times n_2 \times c+d \times n_2+f+j \times M2+\lceil j \times o \rceil) \bmod (1024 \times a_2 \times n_2).$$

13. The method according to claim 9, wherein obtaining the reference offset o of the start location of the CG in the second CG period further comprises:

obtaining the reference offset o of the start location of the CG in the second CG period based on the second CG configuration information, wherein the CG in the second CG period is identified by j, and j is an integer greater than or equal to zero $$((\mathrm{SFN}_2 \times a_2 \times n_2)+(e_2 \times n_2)+y_2)=(R \times a_2 \times n_2+D \times n_2+S+j \times M2+\lceil j \times o \rceil) \bmod (1024 \times a_2 \times n_2)$$

14. The method according to claim 9, wherein obtaining the reference offset o of the start location of the CG in the second CG period further comprises:

obtaining the reference offset o of the start location of the CG in the second CG period based on downlink control information (DCI), wherein the CG in the second CG period is identified by j, and j is an integer greater than or equal to zero $$((\mathrm{SFN}_2 \times a_2 \times n_2)+(e_2 \times n_2)+y_2)=(a_2 \times n_2 \times c+d \times n_2+f+j \times M2+\lceil j \times o \rceil) \bmod (1024 \times a_2 \times n_2)$$

15. An apparatus comprising:

one or more processors to execute instructions stored in memory that configure the apparatus to:

receive first configured grant (CG) configuration information from a network device;

obtain first period duration M1 of a first CG period based on the first CG configuration information, wherein M1 is greater than zero;

obtain a quantity X of CGs in the first CG period, wherein X is an integer greater than zero; and send uplink data to the network device based on the first period duration M1 and the quantity X of the CGs, wherein:

a start location of an $i^{th}$ CG in the first CG period meets the following formula:

$$((\mathrm{SFN}_i \times a \times n)+(e_i \times n)+g_i)=((\mathrm{SFN} \times a \times n)+(e \times n)+y+\lceil (i-1) \times M1/X \rceil) \bmod (1024 \times a \times n)$$

$SFN_1$ represents a start system frame number of the first CG period, a represents a quantity of slots comprised in a system frame, n represents a quantity of symbols comprised in a slot, e represents a start slot index of the first CG period in the system frame $SFN_1$, y represents a start symbol index of the first CG period in the slot e, $SFN_i$ represents a start system frame number of the $i^{th}$ CG in the first CG period, $e_i$ represents a start slot index of the $i^{th}$ CG in the first CG period in the system frame $SFN_i$, $g_i$ represents a start symbol index of the $i^{th}$ CG in the first CG period in the slot et, i=1, 2, . . . , X, $\lceil\ \rceil$ represents rounding up to the nearest integer, mod represents a modulo operation, $SFN_1$, e, y, $SFN_i$, $e_i$, and $g_i$ are integers greater than or equal to zero, and a and n are integers greater than zero.

16. The apparatus according to claim 15, wherein the apparatus is further configured to:

determine a start location of at least one CG in the first CG period based on the first period duration M1 and the quantity X of the CGs; and send the uplink data to the network device based on the start location of the at least one CG in the first CG period.

17. The apparatus according to claim 15, wherein the apparatus is further configured to obtain the quantity X of the CGs in the first CG period based on the first CG configuration information.

18. The apparatus according to claim 15, wherein the apparatus is further configured to obtain the quantity X of the CGs in the first CG period based on downlink control information (DCI).

* * * * *